US008095608B2

(12) United States Patent
Fukasawa et al.

(10) Patent No.: US 8,095,608 B2
(45) Date of Patent: Jan. 10, 2012

(54) EMAIL WRONG TRANSMISSION PREVENTING APPARATUS AND METHOD

(75) Inventors: Ryota Fukasawa, Kanagawa (JP); Aya Higashizono, Kanagawa (JP); Natsu Hashisaka, Kanagawa (JP); Masayoshi Okamoto, Kanagawa (JP); Kiyoshi Kurashige, Kanagawa (JP); Hiroshi Tsuda, Kawasaki (JP); Yoshinori Katayama, Kawasaki (JP); Fumihiko Kozakura, Kawasaki (JP)

(73) Assignees: Fujitsu Limited, Kawasaki (JP); Fujitsu Social Science Laboratory Limited, Kawasaki (JP)

( * ) Notice: Subject to any disclaimer, the term of this patent is extended or adjusted under 35 U.S.C. 154(b) by 0 days.

(21) Appl. No.: 12/659,459

(22) Filed: Mar. 9, 2010

(65) Prior Publication Data

US 2010/0235452 A1   Sep. 16, 2010

(30) Foreign Application Priority Data

Mar. 10, 2009   (JP) .................................. 2009-056615

(51) Int. Cl.
   *G06F 15/16* (2006.01)
(52) U.S. Cl. ....................................................... 709/206
(58) Field of Classification Search .................... 709/206
   See application file for complete search history.

(56) References Cited

U.S. PATENT DOCUMENTS

| | | | | |
|---|---|---|---|---|
| 6,434,601 B1 * | 8/2002 | Rollins | ......................... | 709/206 |
| 6,460,074 B1 * | 10/2002 | Fishkin | ......................... | 709/206 |
| 6,694,353 B2 * | 2/2004 | Sommerer | .................... | 709/206 |
| 7,010,572 B1 * | 3/2006 | Benjamin et al. | ............. | 709/206 |
| 7,252,198 B2 * | 8/2007 | Togawa et al. | ................ | 209/206 |
| 7,302,470 B2 * | 11/2007 | Oizumi | ......................... | 709/206 |
| 7,320,019 B2 * | 1/2008 | Malik | ............................ | 709/206 |
| 7,499,976 B2 * | 3/2009 | Cato | ............................ | 709/207 |
| 7,543,026 B2 * | 6/2009 | Quine et al. | .................. | 709/206 |
| 7,689,654 B2 * | 3/2010 | Walter et al. | ................. | 709/206 |

(Continued)

FOREIGN PATENT DOCUMENTS

EP   1 924 039 A1   5/2008

(Continued)

OTHER PUBLICATIONS

"How to Use Recipient Policies to Control E-mail addresses in Exchange 2003 and Exchange 2000," Microsoft Knowledge Database Q319203, Oct. 25, 2007, pp. 1-6.*

(Continued)

*Primary Examiner* — Andrew Caldwell
*Assistant Examiner* — Melvin H Pollack
(74) *Attorney, Agent, or Firm* — Staas & Halsey LLP

(57) ABSTRACT

An email wrong transmission preventing apparatus calculates memory ratios of addresses of emails in a transmission log by a model expression in which the memory ratios decline over time, compiles the memory ratios of the emails for each destination to set weights, and records the weights in a user weight list. When receiving a planned outgoing email, the apparatus compares the weight of the destination of the planned outgoing email obtained by referring to the user weight list with a predetermined threshold and determines that the destination is "reliable" only if the weight is over the threshold. If even one of the destinations of the planned outgoing email is not "reliable", the apparatus causes a sender terminal to display an address check screen to prompt address checking. When "checked" is inputted, the apparatus transfers the planned outgoing email to an email transmission server.

6 Claims, 19 Drawing Sheets

U.S. PATENT DOCUMENTS

| | | | |
|---|---|---|---|
| 7,774,421 B2* | 8/2010 | Dubovsky et al. | 709/206 |
| 7,788,325 B1* | 8/2010 | Glidden et al. | 709/206 |
| 7,836,134 B2* | 11/2010 | Pantalone | 709/206 |
| 7,849,142 B2* | 12/2010 | Clegg et al. | 709/206 |
| 2002/0087647 A1* | 7/2002 | Quine et al. | 709/206 |
| 2002/0133556 A1* | 9/2002 | Milovanovic | 709/206 |
| 2002/0188690 A1* | 12/2002 | Lee | 709/206 |
| 2004/0049548 A1 | 3/2004 | Nakao | |
| 2004/0093428 A1 | 5/2004 | Arnold et al. | |
| 2004/0215726 A1 | 10/2004 | Arning et al. | |
| 2006/0259557 A1* | 11/2006 | Lin et al. | 709/206 |
| 2007/0094338 A1* | 4/2007 | Kirkham | 709/206 |
| 2007/0106741 A1* | 5/2007 | Christoff et al. | 709/206 |
| 2007/0288575 A1* | 12/2007 | Gillum et al. | 709/206 |
| 2008/0109523 A1 | 5/2008 | Tsuruta | |
| 2008/0114846 A1* | 5/2008 | Sano | 709/206 |
| 2008/0168147 A1* | 7/2008 | Malik | 709/206 |
| 2008/0320091 A1* | 12/2008 | Machiyama | 709/206 |
| 2009/0049140 A1* | 2/2009 | Stoddard et al. | 709/206 |
| 2009/0112998 A1* | 4/2009 | Oprescu-Surcobe | 709/206 |
| 2009/0248654 A1* | 10/2009 | Critelli et al. | 707/5 |
| 2009/0307316 A1* | 12/2009 | Murphy et al. | 709/206 |

FOREIGN PATENT DOCUMENTS

| | | |
|---|---|---|
| JP | 2006-59297 | 3/2006 |
| JP | 2007-293635 | 11/2007 |
| WO | 2007/038583 A1 | 4/2007 |

OTHER PUBLICATIONS

European Search Report dated Jun. 22, 2010 and issued in corresponding European Patent Application 10156108.2.

* cited by examiner

FIG.4

| SENDER ADDRESS | DESTINATION EMAIL ADDRESS LIST | TRANSMISSION DATE/TIME | ... |
|---|---|---|---|
| xxx@xxx.xxx | zzz@zzz.zzz<br>yyy@yyy.yyy | 2009/2/6 | |
| xxx@xxx.xxx | aaa@aaa.aaa | 2009/2/4 | |
| xxx@xxx.xxx | bbb@bbb.bbb | 2009/2/2 | |
| xxx@xxx.xxx | www@www.www | 2009/2/8 | |
| xxx@xxx.xxx | ccc@ccc.ccc | 2009/1/23 | |
| xxx@xxx.xxx | vvv@vvv.vvv<br>uuu@uuu.uuu<br>ttt@ttt.ttt | 2008/2/5 | |
| xxx@xxx.xxx | ddd@ddd.ddd | 2009/2/8 | |
| ... | | | |

11

| DESTINATION ADDRESS | WEIGHT | THE NUMBER OF PAST TRANSMISSIONS | REGISTRATION DATE/TIME | LAST TRANSMISSION DATE/TIME | ... |
|---|---|---|---|---|---|
| aaa@aaa.aaa | 8.706 | 25 | 2008/12/1 | 2009/2/6 | |
| bbb@bbb.bbb | 5.155 | 16 | 2008/12/3 | 2009/2/4 | |
| ccc@ccc.ccc | 4.11 | 12 | 2008/11/25 | 2009/2/2 | |
| ddd@ddd.ddd | 3.993 | 13 | 2008/12/3 | 2009/2/8 | |
| eee@eee.eee | 3.137 | 11 | 2009/1/9 | 2009/1/8 | |
| fff@fff.fff | 3.121 | 7 | 2007/12/15 | 2008/2/5 | |
| ggg@ggg.ggg | 2.865 | 8 | 2007/2/3 | 2009/2/8 | |
| ... | | | | | |

RANGE OF "RELIABLE" TRANSMISSION ADDRESS

THRESHOLD TH (=3.6)

FIG.6

```
WIN = 100      #  LOGS OF HOW MANY EMAILS BACK WILL BE COMPILED
FG = 0.2       #  MINIMUM MEMORY RATIO
TH = 1.0       #  THRESHOLD
PA = (1 - FG) / (WIN - 1)
PB = FG - PA for(int i = 1; i <= WIN; i++)
{
   weight = (PA * WIN / i) + PB;

#  ADD weight TO WEIGHT OF DESTINATION EMAIL ADDRESS OF i-TH EMAIL
   foreach addr in MAIL[i]
   {
      wt (addr) += weight;   # WEIGHT
   }
}
```

FIG.10

| TRANSFER DATE | PERSONNEL ID (EMAIL ID) | TRANSFERRED LOCATION |
|---|---|---|
| 2008/12/1 | aaa | X DIVISION |
| 2008/12/1 | bbb | Y DIVISION |
| 2008/12/10 | ccc | Z DIVISION |
| ... | ... | ... |

| | RATIO OF EMAILS IN WHICH ALL DESTINATION ADDRESSES ARE DETERMINED "RELIABLE" | PARAMETER VALUES |
|---|---|---|
| INVERSE MODEL | 23. 361% | WIN:100 FG:0.4 TH:1.5 |
| EXPONENTIAL MODEL | 33. 722% | WIN:100 FG:0.4 TH:1.5 |
| LINEAR MODEL | 35. 356% | WIN:100 FG:0.4 TH:1.5 |
| UNDECLINED (FLAT) | 40. 456% | WIN:100 FG:0.4 TH:1.5 |

FIG.19

EMAIL WRONG TRANSMISSION PREVENTING APPARATUS AND METHOD

CROSS-REFERENCE TO RELATED APPLICATION(S)

This application is based upon and claims the benefit of priority of the prior Japanese Patent Application number 2009-056615, filed on Mar. 10, 2009, the entire contents of which are incorporated herein by reference.

FIELD

A certain aspect of an embodiment of the present invention relates to an email wrong transmission preventing apparatus, a method, and a program. Specifically, the present invention relates to a technique for presenting risk information related to information leakage to an email sender before a transmission process of the email to warn the sender to prevent wrong transmission of email.

BACKGROUND

As the email system is widely used, incidents of information leakage of email produce serious effects. According to statistics of Japanese Information Processing Development Corporation (for example, fiscal years 2005 to 2007), the leading cause of incidents of information leakage is wrong transmission due to wrong addressing of mail, fax, and email. The leakage incidents caused by wrong transmission of email account for about 5.7% of all leakage incidents.

Most of the incidents of information leakage through email transmission are caused by human errors, such as carelessly setting wrong addresses (destination addresses) of outgoing email. In general, the sender does not notice the careless mistake, and the mistake is recognized when the receiver of the wrong transmission points out the mistake. Therefore, one incident may cause significantly adverse effects. There is a trend of expansion in the use of the email system, and the incident ratio is expected to rise. Therefore, it is more important to prevent wrong transmissions caused by human errors such as careless mistakes.

Conventionally, a mechanism is provided as a prevention measure of wrong transmission of email, in which risk information is presented to the sender before the email transmission to warn the sender to check the address and pay attention. For example, there is a known system, in which a security policy is registered in advance, and when a planned outgoing email violates the security policy, risk information is presented to the sender for warning.

Another example of a conventional method includes a system, in which a white list including reliable addresses registered in advance is prepared, and an address checking process is prevented when the address of an outgoing email is registered in the white list to thereby reduce the load of the sender in the security check process.

Another example of a conventional method includes a system, in which a transmission log of email is stored, an intimacy between a sender and a planned receiver as well as a threshold of availability of transmission according to the intimacy are stored based on the transmission log, words used in the text of an outgoing email are analyzed, the analysis result is determined by the threshold according to the intimacy of the receiver of the planned outgoing email, and the availability of transmission is checked.

The following are documents describe technical backgrounds of the discussed embodiment:

[Patent Literature 1] Japanese Patent Laid-Open No. 2007-293635

[Patent Literature 2] Japanese Patent Laid-Open No. 2006-059297

In a wrong transmission prevention measure of email, the level of an information security check process and the convenience or the operation comfort of an email transmission system are, so to say, in a trade-off relationship. If the security level of a security check process is high (i.e. strict), the convenience or the operation comfort of the system is reduced, and the user feels inconvenient. As a result, the check measure may be meaningless, and in spite of the user's intention, information that needs to be protected may not be protected. If the security level is too low, necessary checking is not sufficiently performed, and the security effects are reduced. Therefore, it is important to balance the convenience and the information security level to maximize the effects of the security measure.

The conventional methods of security measure cause the following problems that reduce the effectiveness of the measure as the operation is continued.

(1) Decrease in Freshness of Risk Information

The user gets used to checking if similar check processes are repeated, and the warning effect of the risk information is reduced. More specifically, there is a warning effect in the risk information when the user is not used to the risk information provided to the user. However, the user gets used to the information if similar information is repeatedly provided, and the user performs an operation of "checked" without thoroughly checking the content. Therefore, the effectiveness of the measure cannot be maintained.

(2) Inappropriateness of Check Level

In general, if the rule compliance obligation is too strict for the user, such as when the frequency of checking is high or when there are many check items, the risk is buried in the excessive information, and there is a high risk of simple mistakes. At the same time, the operation load of the user increases, and the original work may be interfered. Therefore, the excessive rule compliance obligation makes it difficult to maintain the motivation of the user to cooperate with the security check measure, and there is a high risk of making the check process meaningless and perfunctory.

(3) Management Load of White List

Due to the convenience and quickness of email, the email is also widely used as communication means in the working field. The flow of human resources is also high. Therefore, addresses (email addresses) that the user can rely on change on a daily basis. Under the circumstances, the user or the manager always has to maintain the latest white list for registering destination addresses that the user or the manager can rely on as email destinations, and the load of the evaluation and management of the addresses in the white list is large. Particularly, when a transaction, etc. is finished, email transmission to the address is usually not necessary, and the address needs to be immediately deleted from the white list. The deletion of the destination addresses from the white list has to be thorough. However, if the users are in charge of the deletion operations, the deletion determination and the deletion time vary between the users, and the compliance of the security policy may be difficult as a whole.

(4) Load of Inventory of Information Asset

When stored transmission history information (transmission log) is used to provide the risk information, an operation of deleting the storage information as a basis of providing the risk information, or so-called inventory operation of information asset, is necessary along with resetting of the security policy due to a change in the transaction condition, an organizational transfer, etc. If the users are in charge of the inventory operation, the security policy may not be thoroughly performed as a whole, as in the case of the management of the white list. Although the manager can perform the operation or force the user to perform the operation, there is a problem that the load of the manager increases.

SUMMARY

The following is a simple description of a typical summary of an apparatus disclosed in the present specification. More specifically, when a transmission log is updated by email transmission, the disclosed apparatus calculates a memory ratio, which indicates how much the user memorizes an email transmitted in the past, for each email of the transmission log. An expression is used for the calculation, the expression indicating a model in which the values decrease in accordance with tracking back in the transmission order of emails from a reference during processing. The apparatus compiles the memory ratios of the addresses of each email for each address and generates a user weight list recording the compiled values as weights of the addresses.

When a planned outgoing email of the user is received, the apparatus further refers to the stored user weight list, specifies the weight of the address of the planned outgoing email, compares the specified weight with a predetermined threshold, and determines whether to prevent providing information related to the address check.

If the weight of the address of the planned outgoing email is over the threshold, a providing process of information related to the address check is prevented. This is because it can be assumed that the probability of the user memorizing the email transmission to the address is high because, in the past, the email transmission to the address is performed most recently or the number of transmissions to the address is large.

On the other hand, if the weight of the address of the planned outgoing email is equal to or smaller than the threshold, the information related to the address check is provided to the user, and the planned outgoing email is transmitted after a response of "checked" is obtained. This is because it can be assumed that the probability of the user memorizing the email transmission to the address is low because, in the past, a long time has passed since the email transmission to the address or the number of transmissions to the address is small.

Since the transmission log is updated when the planned outgoing email is transmitted after the address check, the apparatus also calculates the memory ratios of the emails transmitted in the past based on the updated transmission log and further compiles the memory ratios to calculate the weights of the addresses to rewrite the user weight list.

The disclosed apparatus calculates the probability of the user memorizing the emails based on the transmission log that changes on a daily basis and compiles the calculated memory ratios to obtain the weights of the addresses. Therefore, as the memory ratio of outgoing email decreases, the weight of the same address changes in each user weight list generation process, and the determination of the necessity of address check also changes. As a result, the address of the planned outgoing email can be checked in a state in which it is unlikely for the user to get used to checking, and the effectiveness of the email wrong transmission prevention measure can be maintained in the operation of the information security check.

The object and advantage of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a transmission log;

FIG. 6 is a diagram illustrating an example of a user weight list;

FIG. 10 is a diagram illustrating an example of a calculation algorithm executed in a user weight list generating unit according to an embodiment;

FIG. 19 is a diagram illustrating a verification result based on measurement data related to a user weight list formed by model expressions and related to ratios of "reliable" destination addresses.

DESCRIPTION OF EMBODIMENT

Figure 1:
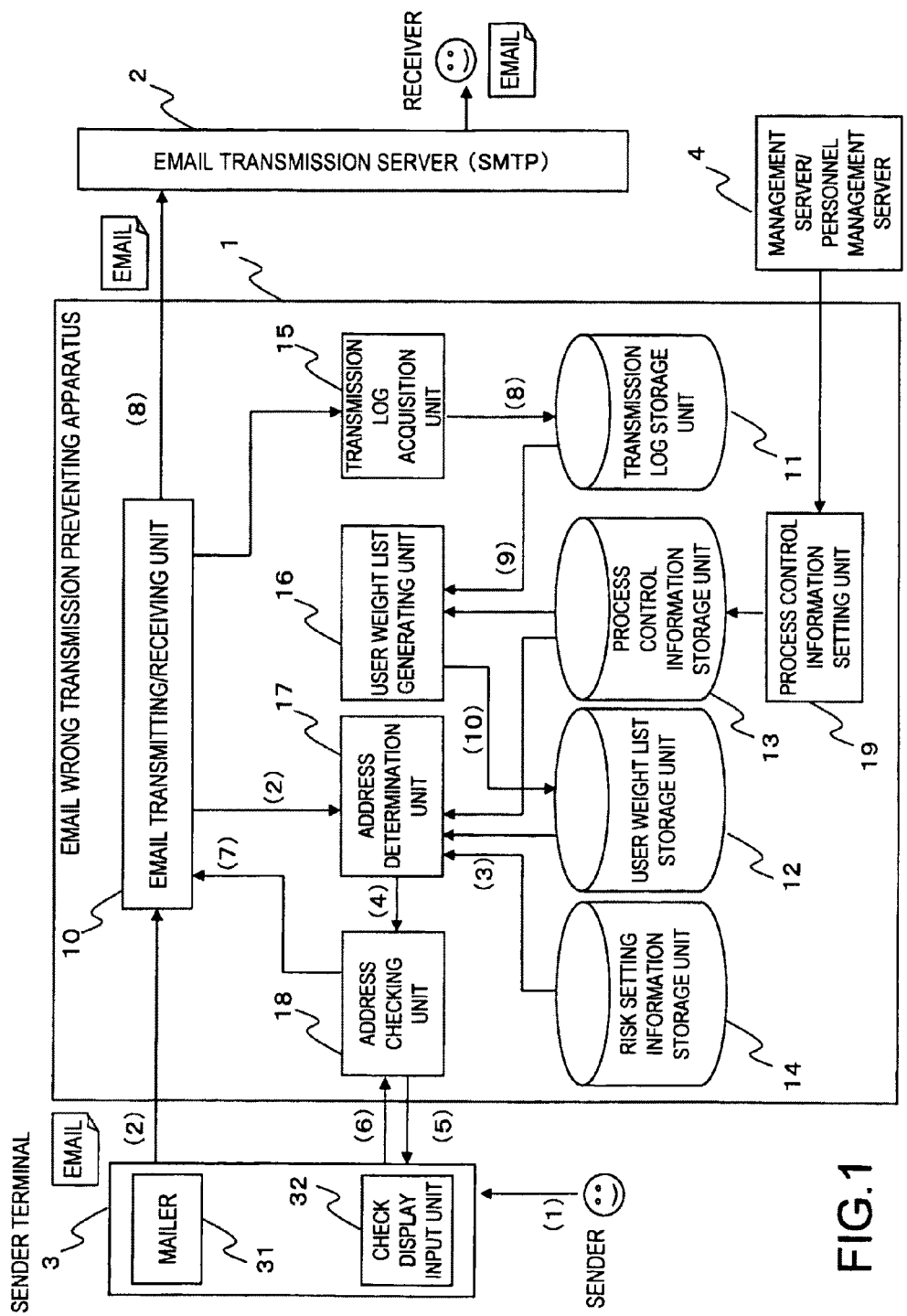
FIG. 1 is a diagram illustrating an example of a configuration of an email wrong transmission preventing apparatus disclosed in the present invention.

FIG. 1 is a diagram illustrating an example of a configuration of an email wrong transmission preventing apparatus according to an embodiment of the present invention.

An email wrong transmission preventing apparatus 1 serves as a proxy of an email transmission server (SMTP server) 2 and transmits and receives data between the email transmission server 2 and a sender terminal 3 used by a user.

A processing operation of the email wrong transmission preventing apparatus 1 will be described first.

The email wrong transmission preventing apparatus 1 stores a transmission log as history information of email transmission every time an email is transmitted. When the transmission log is updated, the email wrong transmission preventing apparatus 1 uses an expression, which indicates a model in which values decrease in accordance with tracking back in the transmission order (such as transmission date and the number of transmissions) from a most recent reference, during the execution of a process to obtain memory ratios, which indicate ratios of how much the user memorizes addresses of emails, of the addresses of the emails in the transmission log for each email transmitted in a predetermined period in the past and further compiles the memory ratios of the addresses of each email for each address to set the weight of each address to generate a user weight list (user weight list generation process).

When a planned outgoing email is received from the sender terminal 3, the email wrong transmission preventing apparatus 1 refers to the user weight list of the sender (user) of the planned outgoing email to specify the weight of the address of the planned outgoing email. The email wrong transmission preventing apparatus 1 then compares the specified weight with a predetermined threshold TH, and if the user weight of the address of the planned outgoing email is over the threshold TH, determines that the address is "reliable" (address determination process).

If even one address of the planned outgoing email is not determined "reliable", the email wrong transmission preventing apparatus 1 executes a providing process of information related to address check of the planned outgoing email. When a response "checked" is obtained from the user, the email wrong transmission preventing apparatus 1 transfers the planned outgoing email to the email transmission server 2, and if the response "checked" is not obtained, transfers the planned outgoing email to the email transmission server 2 as an error email to the sender (address checking process).

In the user weight list generation process, an expression, which indicates a model belonging to a model generally known as a forgetting curve, is used to calculate the memory ratios of the emails.

Figure 2:
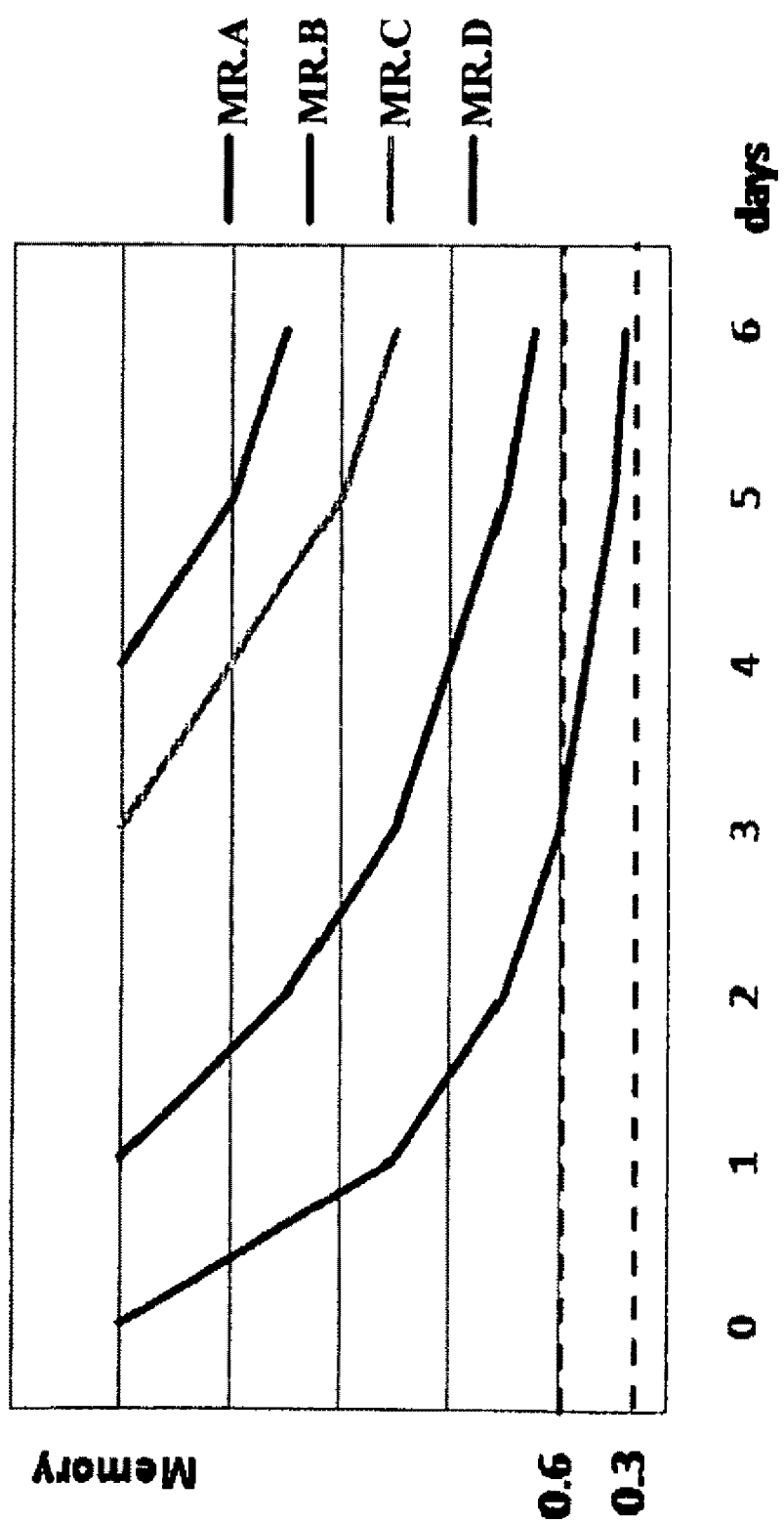
FIG. 2 is a diagram illustrating an example of a general forgetting curve.

FIG. 2 is a diagram illustrating an example of the forgetting curve. The forgetting curve is proposed by psychologist Hermann Ebbinghaus and is a curve indicating a model of forgetting of medium to long-term memory of human. The forgetting curve indicates that the degree of memory of human (Memory) declines in terms of exponential function along with the time passage (days), although the degree may vary between individuals.

The email wrong transmission preventing apparatus 1 uses a model similar to the forgetting curve of FIG. 2, in other words, uses a calculation expression indicating a model, in which values decline (decrease) in accordance with tracking back in the transmission order from the latest, to calculate the memory ratios of the addresses of the emails of the occasionally updated transmission log. According to the calculation process, the memory ratio of a most recently transmitted email is high, and the memory ratio of an email transmitted a long time ago is low.

The email wrong transmission preventing apparatus 1 further compiles the memory ratios of the emails transmitted in the past for each address to set the weights of the addresses. For example, if email transmissions are concentrated on a recent period or if the number of transmissions is large throughout a period, the weight of the address is large. On the other hand, if much time has passed in terms of time and the number of times after email transmissions or if the number of transmissions is small throughout a period, the weight of the address is small.

On the assumption that there is a relationship in the email transmission, in which the user clearly memorizes a partner (address) whom the user has transmitted emails for just several times as long as the email are transmitted recently, and the user only memorizes a partner (address) whom the user has transmitted emails for a considerable number of times if some time has passed after the transmission, the certainty that the user memorizes the address is assumed to be higher when the sum of the memory ratios in a period is higher, and setting of the address as a destination is handled "reliable".

Figure 3:
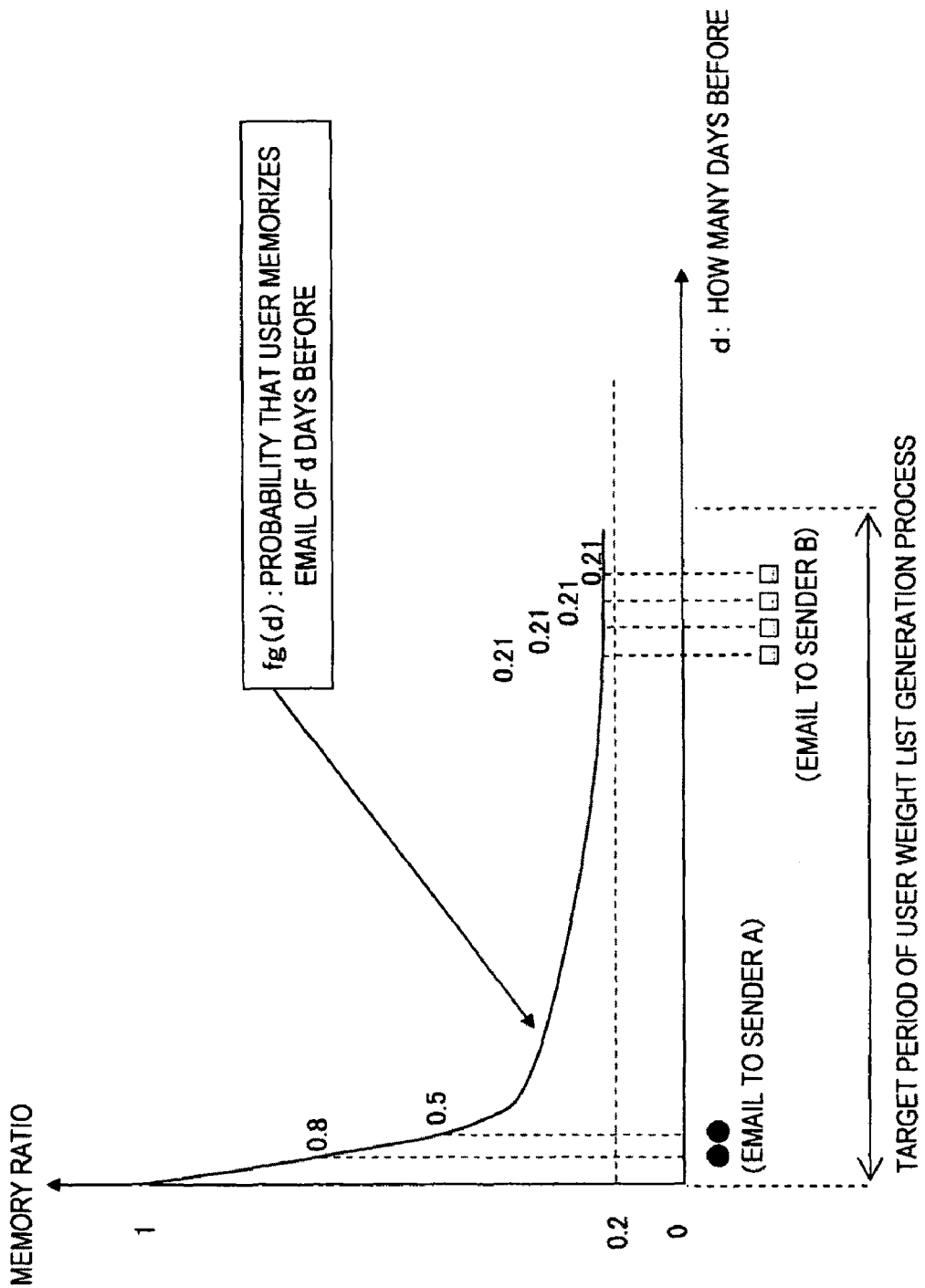
FIG. 3 is a diagram for explaining a weight of an address.

FIG. 3 is a diagram for explaining a principle of the weight of the address. Black circles illustrated in FIG. 3 denote email transmission dates to a destination A, and white rectangles denote email transmission dates to a destination B. The vertical axis denotes memory ratio, and the horizontal axis denotes the number of days (how many days before) tracked back from a reference (for example, current date) in a predetermined period.

The curve illustrated in FIG. 3 is a model illustrating a memory ratio fg(d) that the user memorizes email of d days before, and if fg(d)

d∈MA(P) (MA(P) denotes a set of transmission dates of emails to a destination P), the weight for the destination P is Weight($P$)=Σ$fg(d)$.

In the model illustrated in FIG. 3, it is assumed that the memory ratios of two emails recently transmitted to the destination A are calculated "0.8" and "0.5", and the memory ratios of four emails transmitted a long time ago to the destination B are calculated "0.21", "0.21", "0.21", and "0.21".

The weights of the destinations A and B are

Weight(A)=1.3 and

Weight(B)=0.84, respectively.

In the address determination process, the email wrong transmission preventing apparatus 1 specifies the weight of the destination address of the planned outgoing email from the user weight list and compares the weight with a threshold TH (=1.0).

The weight (1.3) of the destination "A" of the planned outgoing email is over the threshold TH, and the destination A is determined "reliable". The weight (0.84) of the destination "B" is equal to or smaller than the threshold TH, and the destination B is determined not "reliable".

In the address checking process, if there is a destination address determined not "reliable", an address check screen related to the planned outgoing email is displayed to the user to prompt the user to check the address.

The weight of the destination calculated by the email wrong transmission preventing apparatus 1 is obtained based on the memory ratio that decreases in accordance with the transmission order (date and time/the number of times) of the transmission logs stored on a daily basis. Therefore, even if the weight of the destination address is over the threshold TH and determined "reliable" at this point, the weight may not be over the threshold TH and may not be determined "reliable" in a future process.

In this way, the determination results of whether to prevent the address check vary between transmission operations even for emails to the same destination address. Therefore, it is unlikely for the user to get used to the address check, and the effectiveness of the security check process can be maintained.

Processing means of the email wrong transmission preventing apparatus 1 will now be described.

As illustrated in FIG. 1, the email wrong transmission preventing apparatus 1 comprises an email transmitting/receiving unit 10, a transmission log storage unit 11, a user weight list storage unit 12, a process control information storage unit 13, a risk setting information storage unit 14, a transmission log acquisition unit 15, a user weight list generating unit 16, an address determination unit 17, an address checking unit 18, and a process control information setting unit 19.

The email transmitting/receiving unit 10 acquires a planned outgoing email transmitted from the sender terminal 3 and holds the acquired planned outgoing email in an email storage unit (not illustrated) included inside. When a transmission request is received from the address checking unit 18, the email transmitting/receiving unit 10 transfers the held planned outgoing email to the email transmission server 2. The email transmitting/receiving unit 10 includes, so to say, an email transmission processing unit and an email reception processing unit.

The transmission log storage unit 11 stores a transmission log including the sender, the destination, and the transmission date/time of the email transferred to the email transmission server 2.

FIG. 4 is a diagram illustrating an example of the transmission log. The transmission log includes the sender address indicating the addresser of the mail, the destination address indicating the address of the email, and the transmission date/time indicating the date and time of the transmission process. The destination address also records simultaneously processed destination addresses.

The process control information storage unit 13 stores process control information for controlling processes of the user weight list generating unit 16 and the address determination unit 17.

Figure 5:
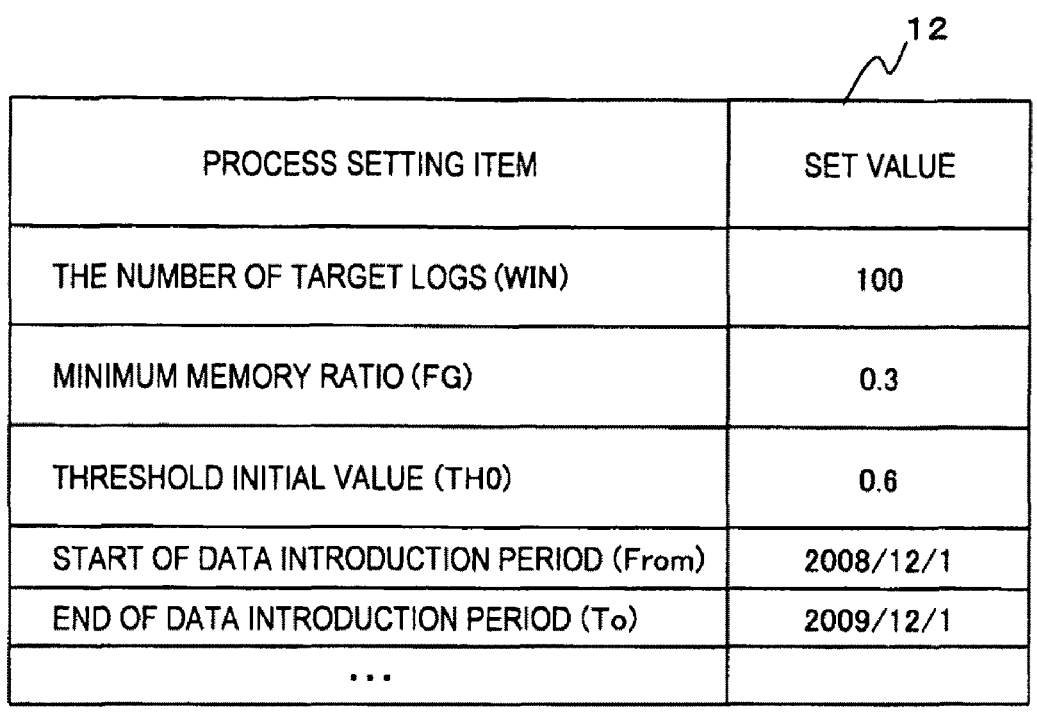
FIG. 5 is a diagram illustrating an example of process control information.

FIG. 5 is a diagram illustrating an example of the process control information. The process control information includes parameters of the number of target logs (WIN), minimum memory ratio (FG), threshold initial value (TH0), start of data introduction period (From), and end of data introduction period (To).

The number of target logs (WIN) denotes the maximum number of transmission logs to be processed by the user weight list generating unit 16. For example, the number of target logs denotes how many outgoing emails (transmission logs) back from a reference time (now) will be used in the process.

The minimum memory ratio (FG) denotes the minimum value of the memory ratio (fg) and is a memory ratio of an email transmitted at the earliest time (oldest) among the transmission logs to be processed.

The threshold initial value (TH0) denotes an initial value of the threshold TH of the determination process of the address determination unit 17.

The start (From) and the end (To) of data introduction period denote the start and the end of the period indicating the transmission date/time of the transmission logs to be processed by the user weight list generating unit 16. Setting the data introduction period can remove the transmission logs not suitable for the determination.

The user weight list storage unit 12 stores the user weight list generated by the user weight list generating unit 16 for each addresser (sender address).

FIG. 6 is a diagram illustrating an example of the user weight list. The user weight list includes the destination address to be processed, the weight calculated for the destination address, the number of past transmissions indicating the total number of times of transmissions in the past, the registration date/time indicating the registration date and time to the user weight list, the last transmission date/time indicating the date and time of the latest transmission, etc.

As illustrated in FIG. 6, when the destination addresses of the user weight list are sorted in descending order of weight, if the address determination unit 17 executes the determination process with a threshold TH=3.6, the address determination unit 17 determines that top four destination addresses, in which the weights are over the threshold TH, are "reliable", and the address checking process for the planned outgoing email is prevented.

The risk setting information storage unit 14 stores risk setting information for controlling a risk calculation process related to information leakage.

The risk setting information defines in advance a relationship between the type of domain of the destination address (classification of domain name), the format and presence of an attached file, the conditions of whether specific expression is included in the email title, the conditions of whether specific expression is included in the email text, and the risk of the email satisfying the conditions. The risk is a value equal to or greater than 1.0, and the risk is set higher when the value is larger. For example, in the condition setting based on the classification of domain name, the risk is set depending on whether the domain name indicates a competitor (another company in the same field), a cell phone email, or a mailing list.

The address determination unit 17 calculates the risk (RF) of the planned outgoing email based on the risk setting information.

The transmission log acquisition unit 15 stores, in the transmission log storage unit 11, the transmission log of the planned outgoing email transferred to the email transmission server 2 by the email transmitting/receiving unit 10.

At a predetermined period or when, for example, the transmission log updating process is completed, the user weight list generating unit 16 acquires the process control information from the process control information storage unit 13 and the transmission log from the transmission log storage unit 11. The user weight list generating unit 16 uses a predetermined expression to calculate the memory ratios of the addresses of the emails in the transmission log and calculates the sum of the memory ratios of each sender address as a weight of the transmission address. The user weight list generating unit 16 then creates a user weight list recording the weights of the destination addresses and stores the list in the user weight list storage unit 12.

Figure 7:
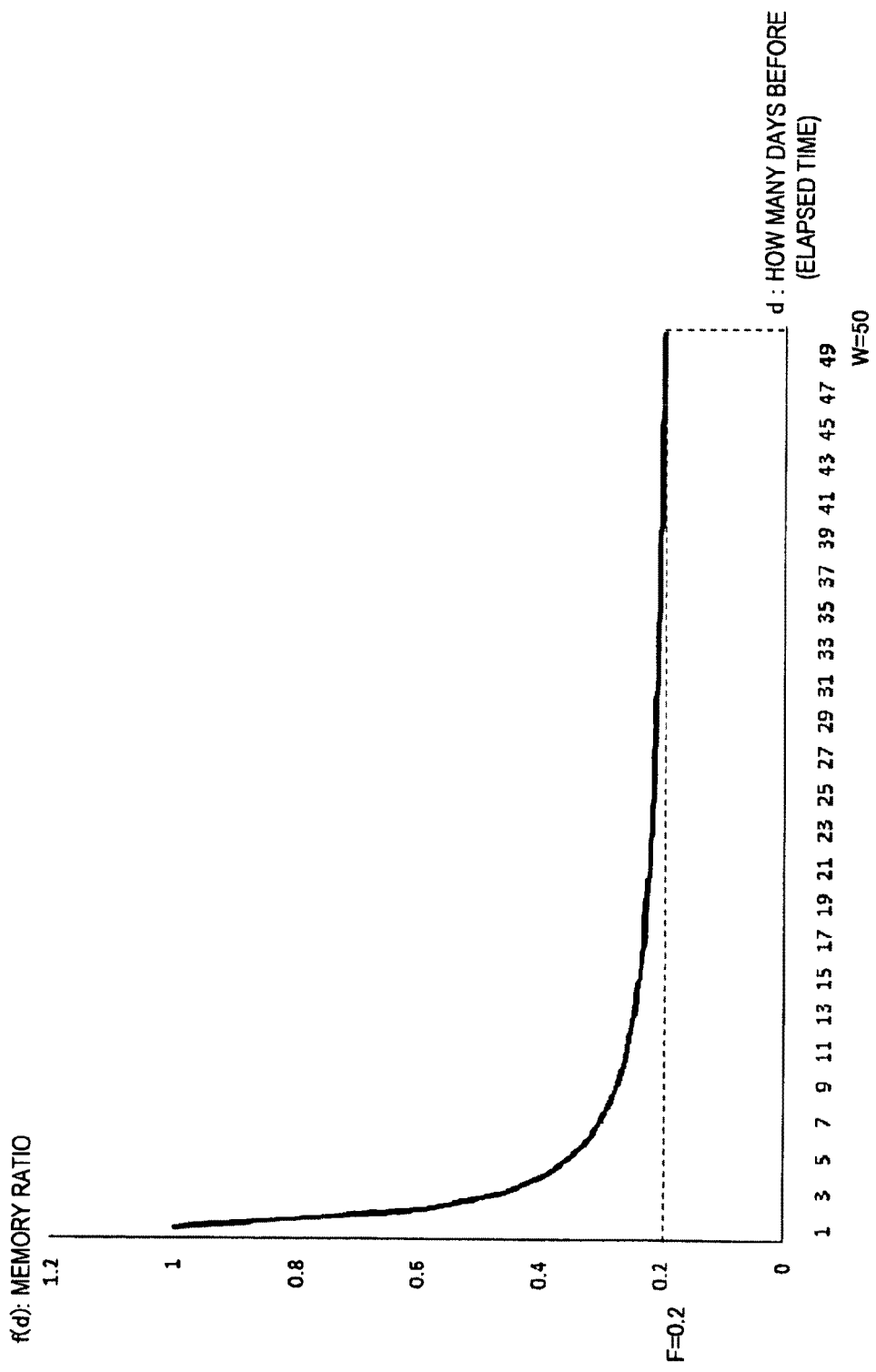
FIG. 7 is a diagram illustrating an example of an inverse model used in a user weight list generation process.

FIG. 7 is a diagram illustrating an example of a model indicating a calculation expression used in the process of the user weight list generating unit 16. The model of FIG. 7 is an inverse model and is based on an expression using an inverse to obtain the memory ratio at an elapsed time d, in other words, probability f(d) that the user memorizes the email of d days before.

The expression of the model of FIG. 7 can be illustrated as follows.

$$f(d)=(1-F)(W/d-1)/(W-1)+F$$

d: elapsed time
W(WIN): upper limit of elapsed time
F(FG): minimum memory ratio

The elapsed time d denotes, in terms of the number of days for example, how many days the transmission date of the email to be processed is before the reference day. For example, d is an integer from 1 to W.

The upper limit W of the elapsed time denotes an upper limit of the number of processes of an elapsed time d (transmission date of email), which is the unit of processing. More specifically, W denotes the maximum value of the elapsed time and is a parameter indicating the upper limit of the number of transmission days tracked back from the reference day. For example, W=50.

The minimum memory ratio F is a parameter indicating the probability (memory ratio) that an email transmitted on the transmission date of the upper limit W of the elapsed time, i.e. the oldest transmission date (for example, transmission date tracked back for 50 days), is memorized. For example, F=0.2.

In the present embodiment, the user weight list generating unit 16 executes a calculation algorithm of the weight of the destination address using the model expression.

The user weight list generating unit 16 is not limited to the model expression illustrated in FIG. 7, and for example, another known model expression may be used.

Figure 8:
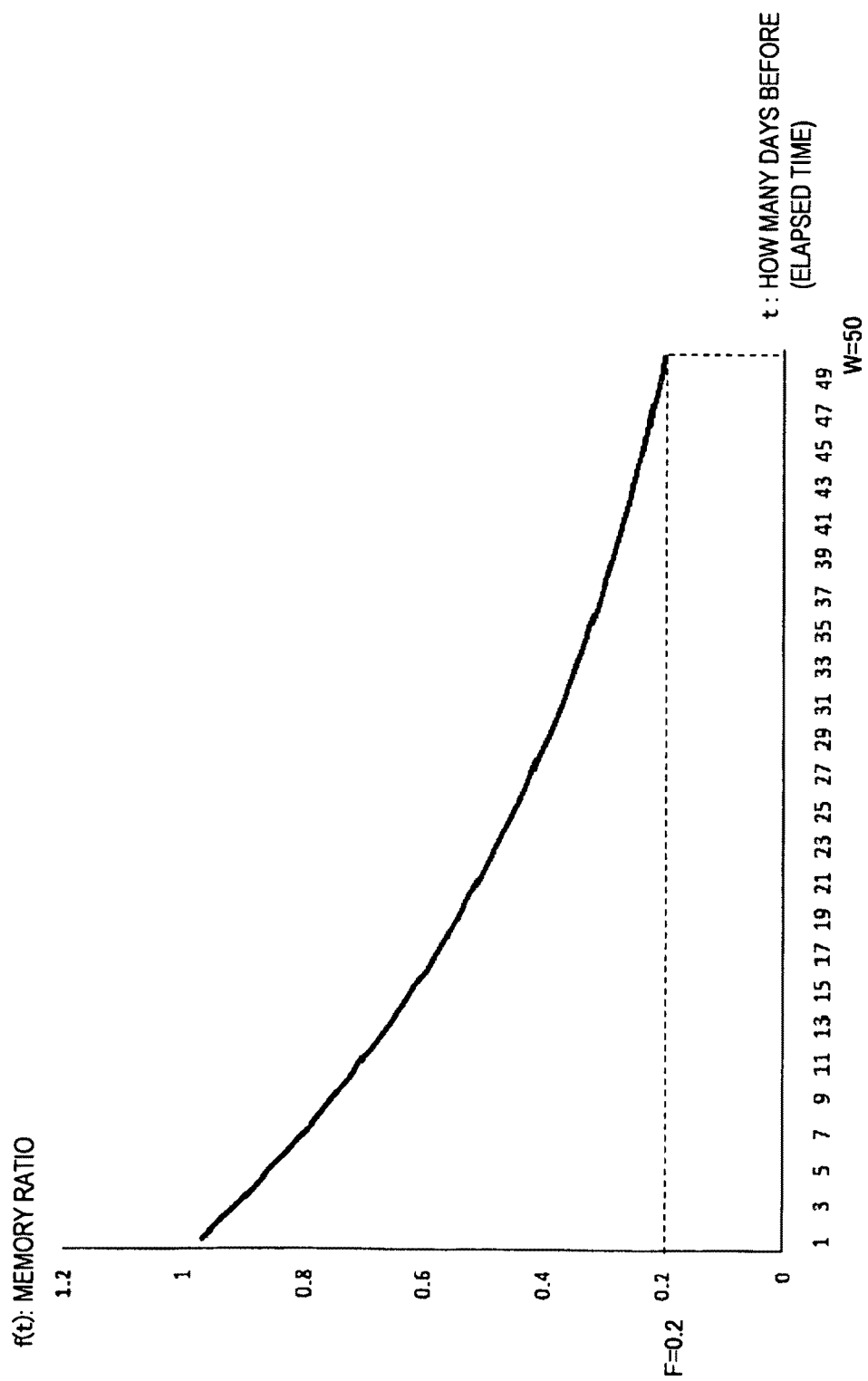
FIG. 8 is a diagram illustrating an example of an exponential model used in the user weight list generation process.
Figure 9:
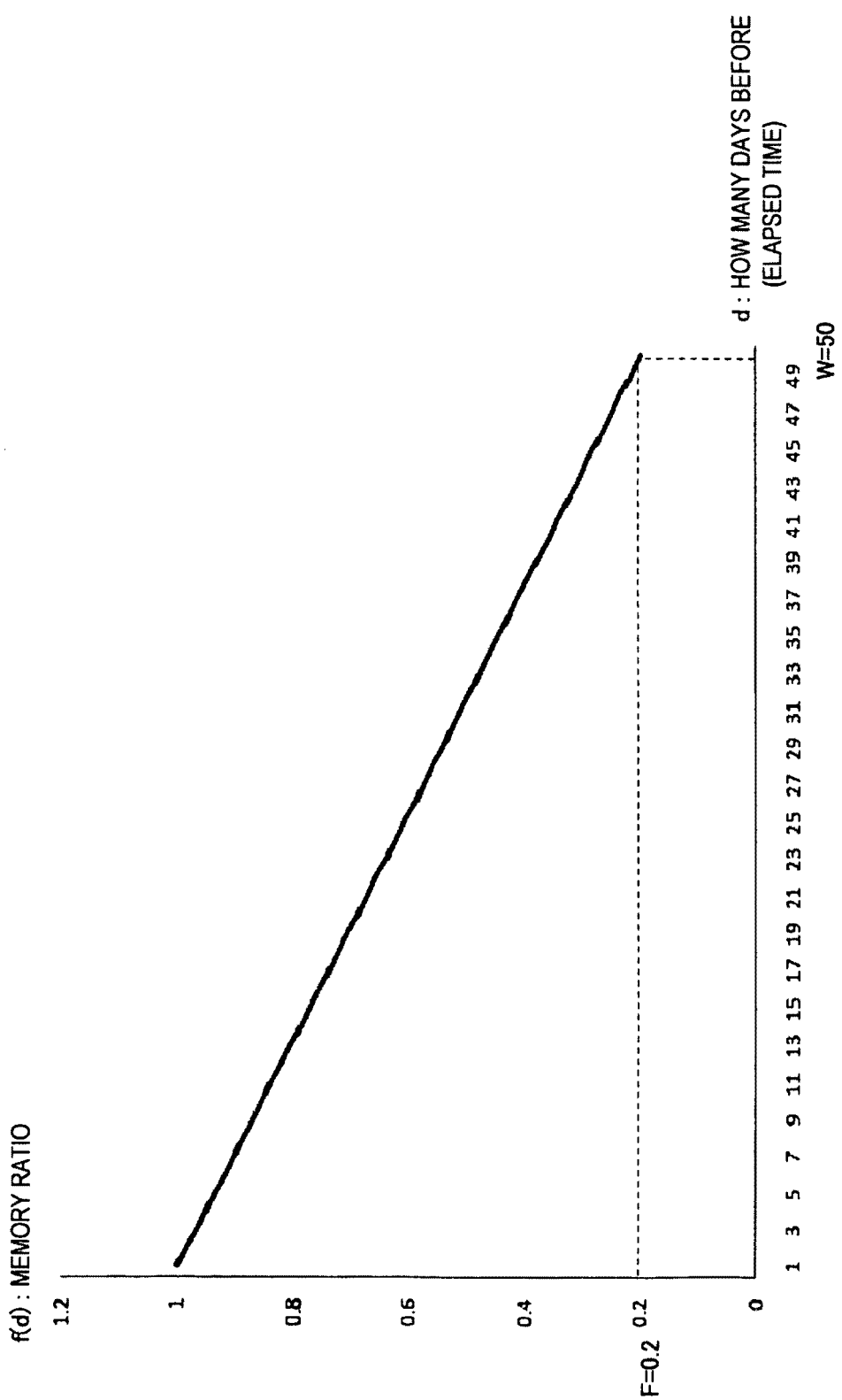
FIG. 9 is a diagram illustrating an example of a linear model used in the user weight list generation process.

FIGS. 8 and 9 are diagrams illustrating examples of the model indicating the calculation expression used in the process of the user weight list generating unit 16.

The model of FIG. 8 is an exponential model proposed in the original forgetting curve and is based on an expression using an exponential function to obtain the probability of memorization based on an elapsed time t, or for example, in terms of the number of days, probability f(t) that the user memorizes the email of t days before.

The expression of the model of FIG. 8 can be illustrated as follows.

$$f(t)=e^{(-At)}$$

where $A=-\ln(F)/W$
t: elapsed time (days)
W(WIN): upper limit of elapsed time
F(FG): minimum memory ratio The elapsed time t denotes, in terms of the number of days for example, how many days the transmission date of the email to be processed is before the reference day. For example, t is an integer from 1 to W. The upper limit of elapsed time W and the minimum memory ratio F are similar to those in FIG. 7. However, if the expression of the model of FIG. 8 is applied to the memory ratio of the address of the outgoing email, the decline of the memory ratio is little too gentle. An inappropriate "reliable" determination may be performed, such as a wrongly transmitted address is also processed, or the weight of a destination address, to which emails are transmitted just several times in the past, also sluggishly decreases.

The model of FIG. 9 is a linear model and is an expression using a linear function to obtain the probability of memorization based on the elapsed time d, or in terms of the number of days for example, probability f(d) that the user memorizes the email of d days before.

The expression of the model of FIG. 9 can be illustrated as follows.

$$f(d)=(F-1)/(W-1)d+(W-F)/(W-1)$$

d: elapsed time
W(WIN): upper limit of elapsed time
F(FG): minimum memory ratio

The elapsed time d, the upper limit of elapsed time W, and the minimum memory ratio F are the same as illustrated in FIG. 7. However, the decline of the memory ratio is further gentle in the expression of the model of FIG. 9, and a wrong "reliable" determination may be performed.

FIG. 10 is a diagram illustrating an example of a calculation algorithm executed in the user weight list generating unit 16 according to an embodiment.

In a process by an example of a source code of the calculation algorithm illustrated in FIG. 10, the following parameters are used to perform the calculation by the expression of the inverse model as illustrated in FIG. 7.

WIN: the number of processing targets,
FG: minimum memory ratio,
TH: threshold of address determination In this case, the number of email transmissions i is used as a value of WIN, and i is a natural number up to WIN. The memory ratio f(i) denotes the probability that the user memorizes the email in the transmission by the number of transmissions i (transmission executed i times before the transmission process of a reference). The memory ratio f(1) of the email transmitted by the number of transmissions i=1 (latest) is "1", and the memory ratio f(WIN) of the email transmitted by the number of transmissions i=WIN (the number of transmissions tracked back to the greatest extent in the data to be used) is "0.2" which is the minimum memory ratio fg.

The weight (wt(addr)) of the destination address (addr) is a sum of the memory ratios f(i) of the emails transmitted to the destination address (addr).

When the planned outgoing email is stored in the email storage unit of the email transmitting/receiving unit 10, the address determination unit 17 refers to the user weight list corresponding to the sender address of the planned outgoing email and specifies the weight of the destination address of the planned outgoing email. The address determination unit 17 then compares the specified weight with the threshold TH, determines that the destination address is "reliable" if the weight is over the threshold TH, and determines that the destination address is not "reliable" if the weight is equal to or smaller than the threshold TH.

The address determination unit 17 may calculate the risk RF corresponding to the condition met by the planned outgoing email if the condition for determining the risk is stored in the risk setting information storage unit 14 and may increase or decrease the threshold TH0 based on the calculated risk to use the changed threshold TH for comparison with the weight of the destination. The risk RF is a value equal to or greater than 1.0, and depending on the degree of the risk, values of risk large (=2.0), risk medium (=1.5), and risk small (=1.0) are obtained.

The address determination unit 17 sets $$TH=TH0*RF$$

to change the threshold TH.

For example, the following condition is defined in the risk setting information storage unit 14.

"The risk is 1.0 if a file is not attached to an email address other than foo.co.jp".

"The risk is 1.5 if a file is attached to an email address other than foo.co.jp".

Furthermore, the threshold TH0 is "3.6", and the destination address of the planned outgoing email is "ddd@ddd.ddd".

The risk is small (1.0) when a file is not attached to the planned outgoing email. Therefore, with reference to the user weight list of FIG. 6, the weight (3.9993) of the destination address is greater than the threshold TH=3.6*1.0=3.6, and the destination address is determined "reliable".

However, the risk is medium (1.5) when a file is attached to the planned outgoing email. Therefore, the weight of the destination address is equal to or smaller than the threshold TH=3.6*1.5=5.4, and the destination address is not determined "reliable".

In this way, the determination condition of "reliable" can be changed in accordance with the state of the planned outgoing email even for the same destination address to strengthen the security level.

If the destination address of the planned outgoing email is not determined "reliable", the address checking unit 18 displays, on the sender terminal 3, an address check screen for providing risk information including the address check. If "checked" for the displayed address is received from the sender terminal 3, the address checking unit 18 requests the email transmitting/receiving unit 10 to transfer the planned outgoing email.

The generation and output process of the address check screen of the address checking unit 18 is realized using an existing address checking process.

The process of the address checking unit 18 is prevented when all destination addresses of the planned outgoing email are determined "reliable".

Figure 11:
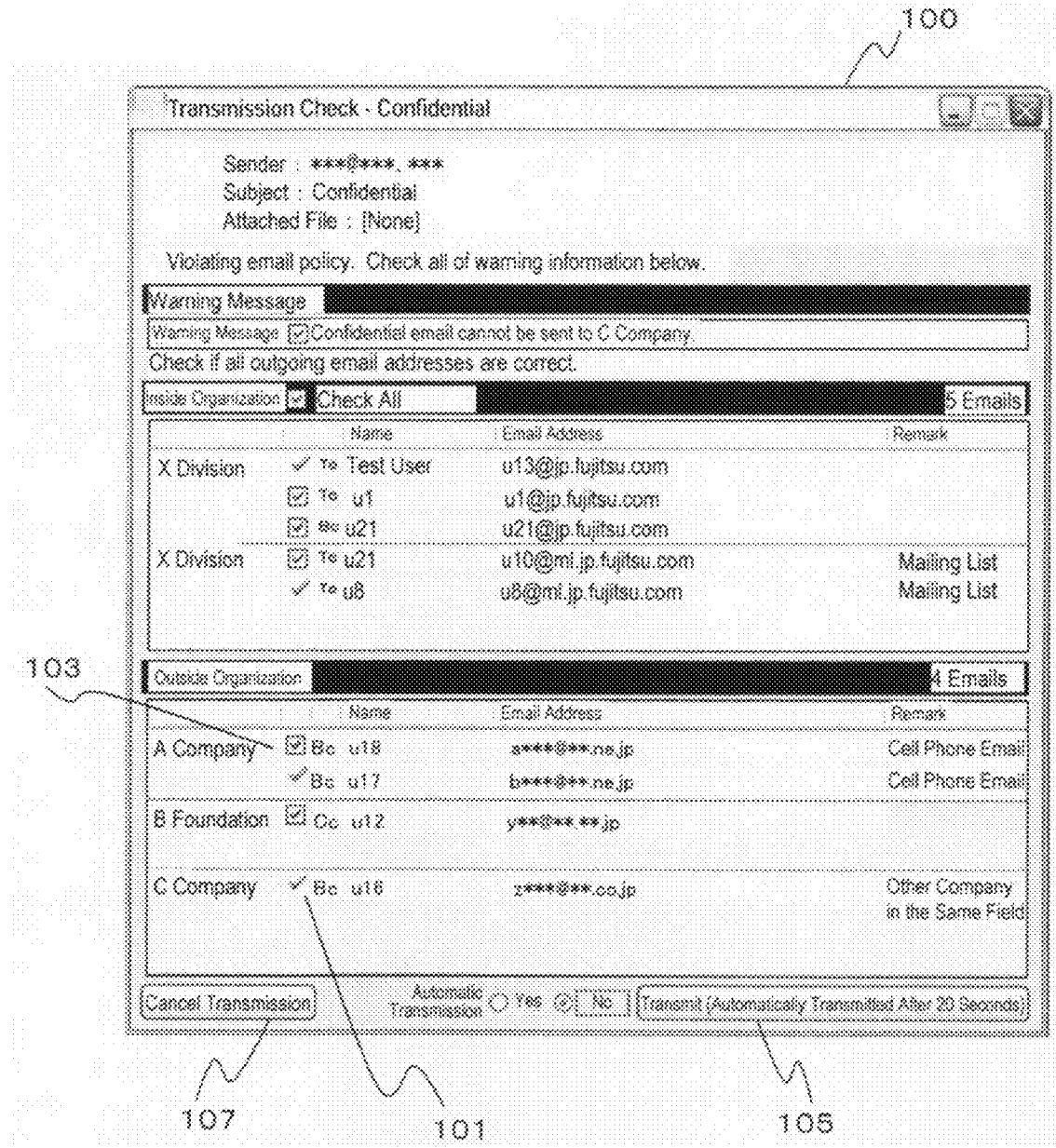
FIG. 11 is a diagram illustrating an example of an address check screen.

FIG. 11 is a diagram illustrating an example of the address check screen provided to the user.

An address check screen 100 of FIG. 11 is a screen for prompting the address check of the planned outgoing email.

On the address check screen 100, for a destination address in which the weight is equal to or greater than the threshold TH, a check mark 101 indicating that the address is checked is displayed in advance in a check box for inputting "checked". The check box of the destination address, in which the weight is smaller than the threshold TH, is displayed by a blank 103. The address check screen 100 of FIG. 11 illustrates a state in which a check mark is inputted by a user operation in the blank 103 of the check box of the destination address in which the weight is smaller than the threshold TH.

The planned outgoing email may be highlighted or a warning message may be displayed on the address check screen 100 based on the processing result in the risk calculation process when whether the planned outgoing email is an email to another company in the same field, a cell phone email, or transmission by a mailing list is determined.

When the user checks all destination addresses and inputs check marks in the check boxes 103 on the address check screen 100 to perform an operation of selecting a button 105 for instructing a transmission request, the sender terminal 3 transmits "checked" to the email wrong transmission preventing apparatus 1. When a button 107 for instructing canceling of transmission of the address check screen 100 is selected, transmission cancelling is requested to the email wrong transmission preventing apparatus 1, and the planned outgoing email held by the email transmitting/receiving unit 10 is converted into an error email for the sender.

If the button 105 is not selected after 20 seconds from the input of all check marks in the check boxes 103 on the address check screen 100 of FIG. 11, it is assumed that the user has requested transmission, and the sender terminal 3 transmits "checked" to the email wrong transmission preventing apparatus 1.

When "checked" is notified from the sender terminal 3, the address checking unit 18 requests the email transmitting/receiving unit 10 for the transfer. The email transmitting/receiving unit 10 transfers the planned outgoing email to the email transmission server 2. The transmission log acquisition unit 15 stores the sender address of the transferred planned outgoing email, the destination address, and the date and time of the transmission process in the transmission log storage unit 11. If cancel of transmission is notified from the sender terminal 3, transfer of an error email is requested for the email transmitting/receiving unit 10. The email transmitting/receiving unit 10 transfers the error email, in which the address is converted into the address of the sender, to the email transmission server 2. In this case, the transmission log acquisition unit 15 does not store the transmission log.

The process control information setting unit 19 sets or updates the process control information stored in the process control information storage unit 13. The process control information setting unit 19 cooperates with the management server that manages the information security policy related to the email transmission server 2 or with the management server (management server/personnel management server) 4 of the personnel management system of the user, etc. to automatically acquire information related to a change in the information security policy and information related to an organization change from the management server 4 to set and update the parameters of the model expression of the process control information.

The process control information setting unit 19 can also periodically acquire information of an input operation of the manager or of the management server 4 to set or update the process control information.

The data introduction period of the process control information is a condition for extracting the transmission logs to be processed by the user weight list generating unit 16 based on the transmission date/time. Therefore, the transmission logs to be processed vary depending on the setting of the data introduction period.

The user weight list generating unit 16 acquires the transmission logs to be processed by one of the following processes.

1) An example of processing in which transmission logs from the reference to the upper limit provided by WIN are extracted (i or d is a natural number up to WIN), and only the transmission logs among the extracted transmission logs in which the transmission date/time is within the data introduction period are used (first example of acquisition).

2) An example of processing in which transmission logs in which the transmission date/time is within the data introduction period are extracted, and the extracted transmission logs are used in the order of transmission date/time from the reference to the upper limit provided by WIN (second example of acquisition).

Figure 12:
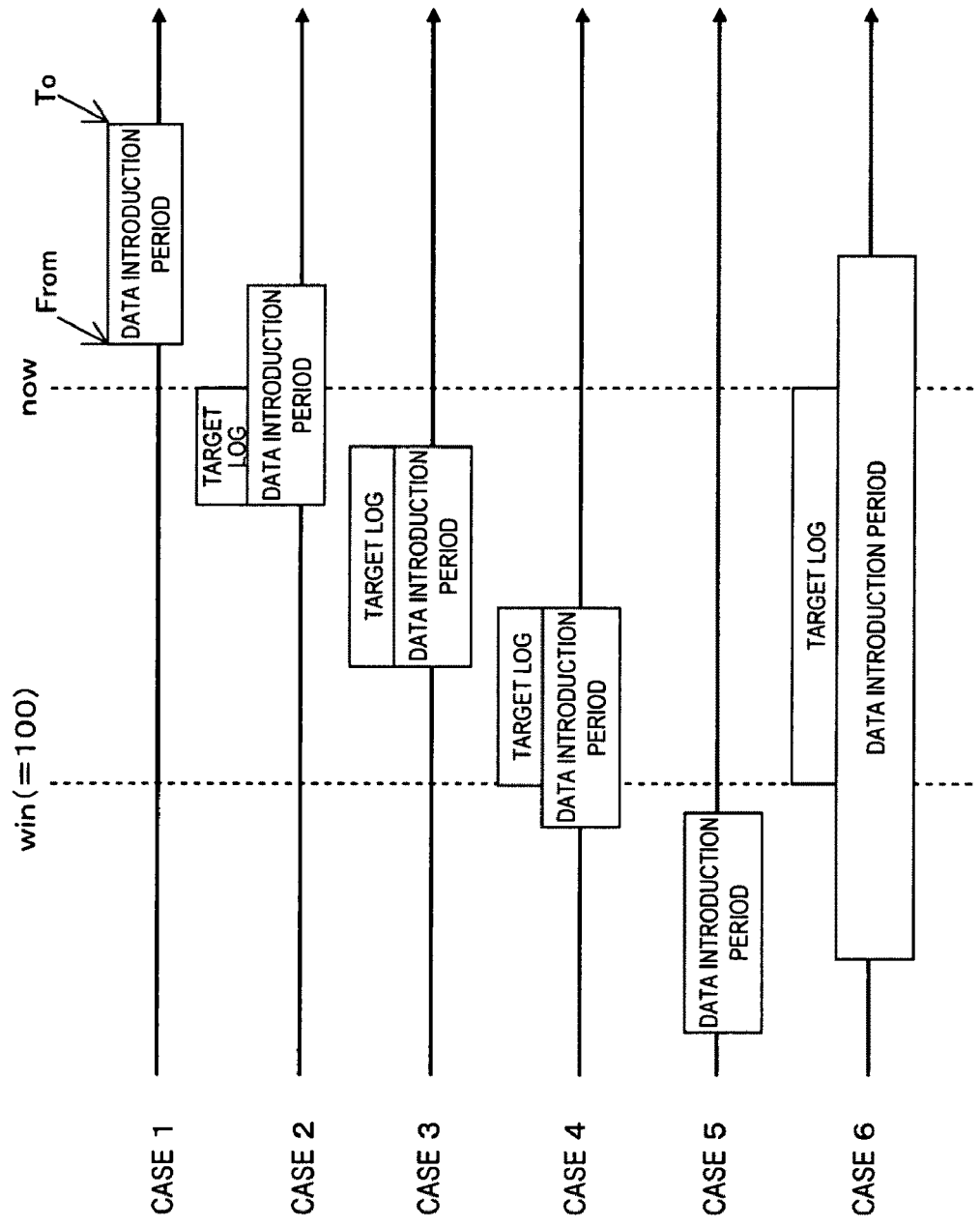
FIG. 12 is a diagram illustrating a relationship between a data introduction period and a transmission log to be processed in a first example of transmission log acquisition.

FIG. 12 is a diagram for explaining a relationship between the data introduction periods and the transmission logs to be processed in the case of the first example of acquisition.

In FIG. 12, arrows from left to right denote the passage of time. In FIG. 12, "WIN" (=100) denotes the number of logs to be processed by days, and "now" denotes the reference time, which is the current date.

In a case 1 of FIG. 12, a data introduction period is set, in which the start (From) to the end (To) is after the current date. The case 1 indicates that records in a future data introduction period will be processed. Since the records of the transmission logs, in which the transmission date/time falls under the transmission dates from the current date to the 100 days before, will be extracted, the number of records to be processed in the process of the current date is zero.

In a case 2 of FIG. 12, a data introduction period is set, in which the start is before the current date and the end is after the current date. The records to be processed in the process of the current date are records from the current date to the transmission date of the start of the data introduction range.

In a case 3 of FIG. 12, a data introduction period is set, in which the start and the end are before the current date/time. Since the start and the end are within the range of 100 days before the current date, the records to be processed in the process of the current date are records in which the transmission date/time is from the start to the end of the data introduction period.

In a case 4 of FIG. 12, a period is set, in which the start is before 100 days before. Therefore, the records to be processed in the process of the current date are records in which the transmission date/time is from 100 days before to the end of the data introduction period.

In a case 5 of FIG. 12, a data introduction period is set, in which the start and the end are before 100 days before. The number of records to be processed in the process of the current date is zero.

In a case 6 of FIG. 12, a data introduction period is set, in which the start is before 100 days before and the end is after the current date. Therefore, the records to be processed in the process of the current date are records in which the transmission date/time is from 100 days before to the current date.

Figure 13:
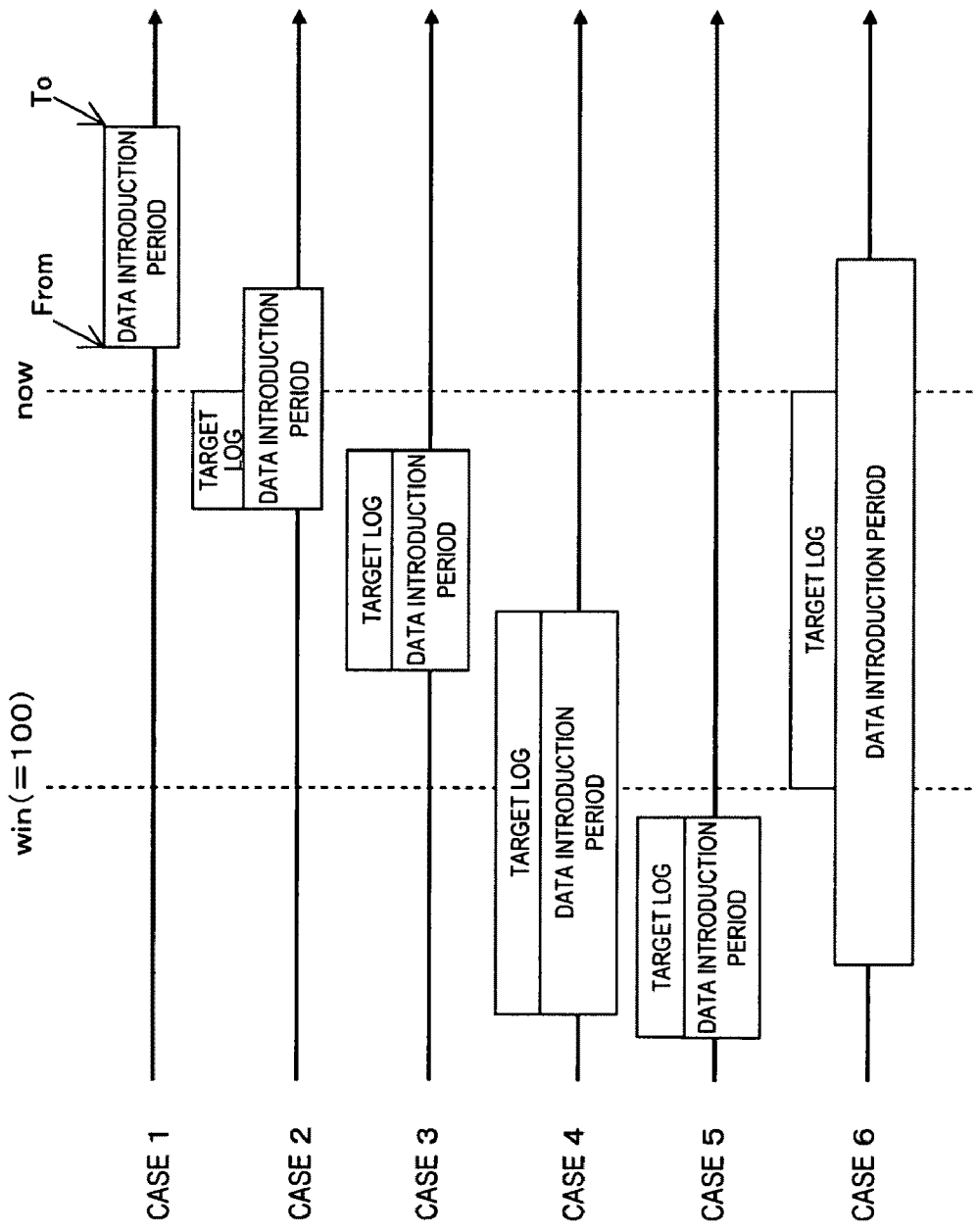
FIG. 13 is a diagram illustrating a relationship between a data introduction period and a transmission log to be processed in a second example of transmission log acquisition.

FIG. 13 is a diagram for explaining a relationship between the data introduction periods and the transmission logs to be processed in the second example of acquisition.

In cases 4 and 5 illustrated in FIG. 13, data introduction periods are set, in which the start and the end are before the current date. In these cases, the records to be processed in the process of the current date are transmission logs up to 100 days tracked back from the end of the data introduction period among the records transmitted in the period from the start to the end of the data introduction period.

In cases 1, 2, 3, and 6 of FIG. 13, although data is extracted in the same way as the cases 4 and 5 of FIG. 13, the results are the same as the cases provided with the same numbers illustrated in FIG. 12.

As illustrated in FIGS. 12 and 13, the parameter WIN in the first example of acquisition denotes a value for setting the upper limit of the process. The parameter WIN in the second example of acquisition denotes a value for setting the processing accuracy. In the present embodiment, the user weight list generating unit 16 introduces the first example of acquisition and executes the process in accordance with the parameters of the process control information that is set to have the relationship illustrated in the case 6 of FIG. 12.

The data introduction period of the process control information is updated based on the information transmitted from the management server 4.

The process control information setting unit 19 acquires information, such as a change in the section that the user belongs to and management information of a project that the user belongs to, from the management server 4 and sets the data introduction period of the process control information.

This is because when the section of the user changes from a Y division to an X division by personnel transfer, the destinations used in the work of the Y division that the user has belonged before are usually unnecessary in the X division after the transfer.

Figures 14A, 14B:
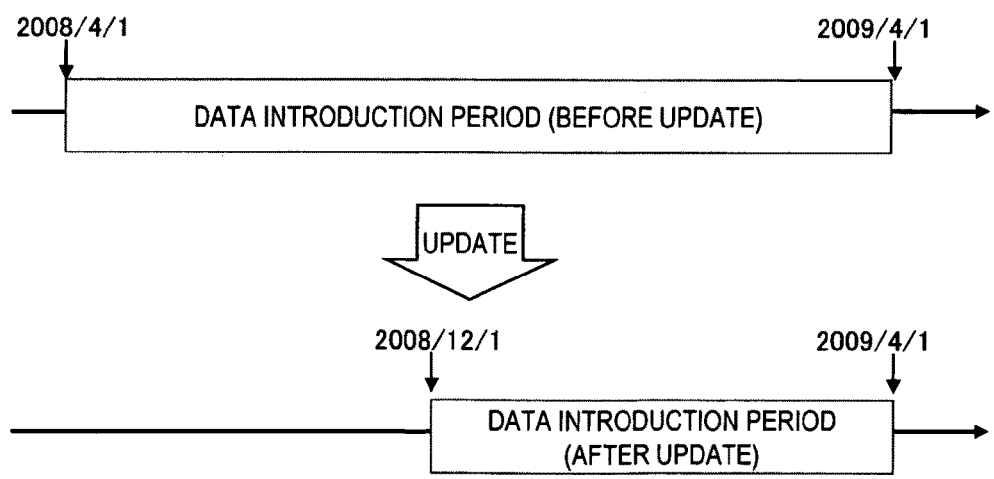
FIG. 14A and FIG. 14B are diagrams illustrating an example of data acquired from an external server.

FIGS. 14A and 14B are diagrams for explaining an update of the data introduction period due to personnel transfer.

FIG. 14(A) illustrates an example of personnel transfer information periodically and automatically collected by the email wrong transmission preventing apparatus 1 from the management server 4.

The personnel transfer information includes transfer date indicating dates of transfers, personnel ID for identifying personnel to be transferred, and transferred location indicating new sections. In the example, the header (email ID) of the email address of the user is used as the personnel ID.

The process control information setting unit 19 periodically (for example, 9:00 AM everyday) acquires the personnel transfer information illustrated in FIG. 14(A) from the external management server 4. The process control information setting unit 19 acquires a record of the latest date/time among the records including the personnel ID of the user. If the transfer date/time of the acquired record is before the current date, the process control information setting unit 19 updates the start (From) of a learning data period of the process control information stored in the process control information storage unit 13 to the transfer date/time.

If there is no record of the latest date/time, the process control information setting unit 19 does not update the process control information.

For example, when the personnel transfer information of FIG. 14(A) is acquired, the process control information setting unit 19 obtains a record of transfer date Dec. 1, 2008 of Mr. user aaa. In relation to the start (Apr. 1, 2008) and the end (Apr. 1, 2009) of the data introduction period before the update, the process control information setting unit 19 updates the start by the acquired transfer date. As a result, the data introduction period after the update is from Dec. 1, 2008 to Apr. 1, 2009 as illustrated in FIG. 14B.

The sender terminal 3 comprises an email transmitting/receiving unit (mailer) 31 and a check display input unit 32.

The mailer 31 executes a known email transmission/reception process and transmits an email applied with the transmission process to the email wrong transmission preventing apparatus 1. The check display input unit 32 executes a known display process of XML (Extensible Markup Language) or HTML (Hyper Text Markup Language) data to display the address check screen 100 transmitted from the email wrong transmission preventing apparatus 1 on a display unit (not illustrated) of the sender terminal 3 and transmits an address check inputted by a user operation through an input device (not illustrated) to the email wrong transmission preventing apparatus 1. FIGS. 15 to 18 are diagrams illustrating processing flows of the email wrong transmission preventing apparatus 1 according to an embodiment.

Figure 15:
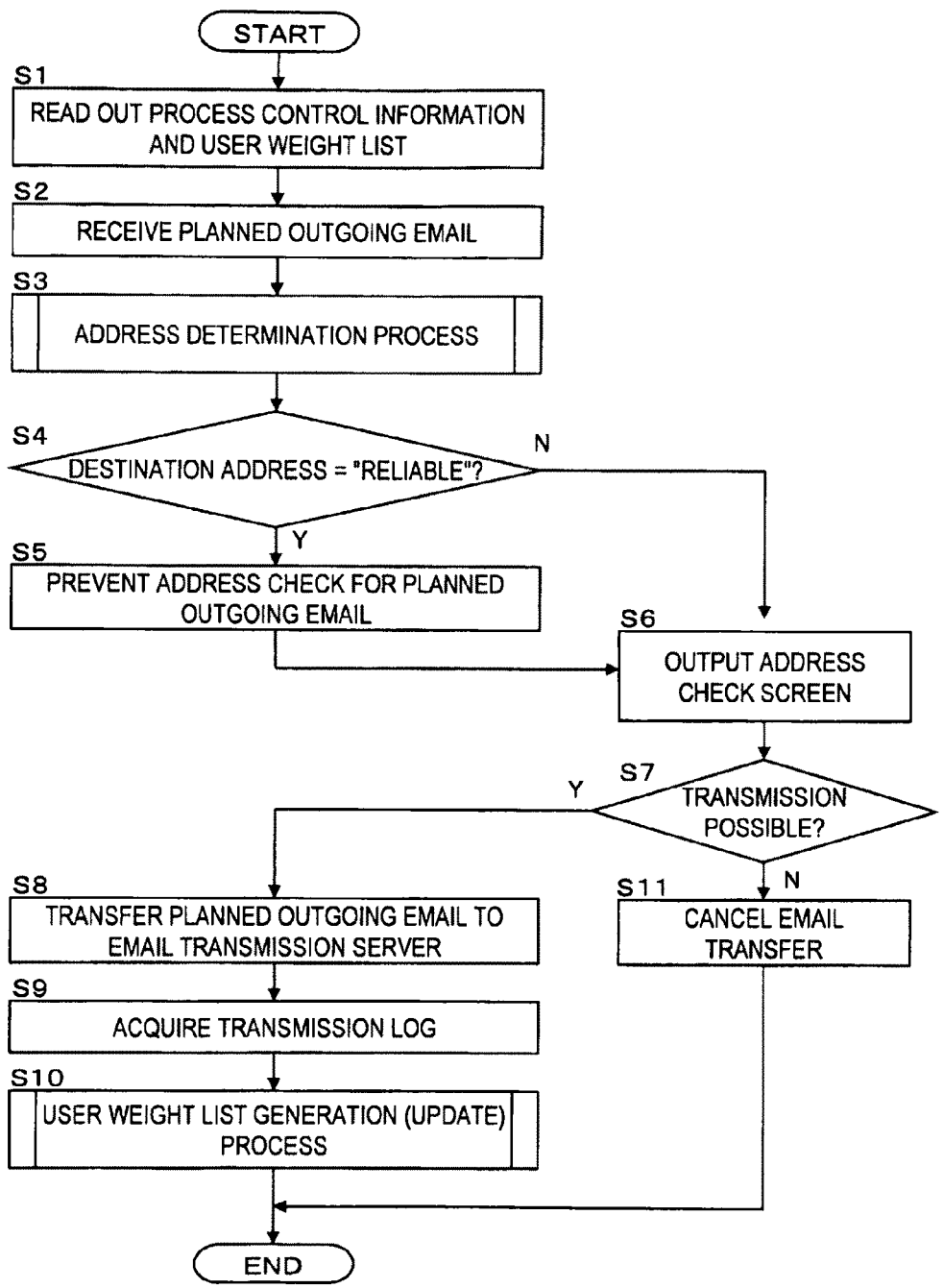
FIG. 15 is a processing flow diagram indicating a summary of processing of an email wrong transmission preventing apparatus according to an embodiment.

FIG. 15 is a processing flow diagram illustrating a flow of the entire process of the email wrong transmission preventing apparatus 1.

When the email wrong transmission preventing apparatus 1 starts the process, the address determination unit 17 reads out the process control information and the user weight list (step S1). The email transmitting/receiving unit 10 receives a planned outgoing email from the mailer 3, and the email storage unit holds the email (step S2).

The address determination unit 17 then applies an address determination process to the planned outgoing email held in the email storage unit (step S3). Details of the address determination process will be described below using FIGS. 16 and 17.

In the address determination process of step S3, if the address determination unit 17 determines that all destination addresses of the planned outgoing email are "reliable" (Y of step S4), the address checking unit 18 prevents the address checking process for the planned outgoing email (step S5).

On the other hand, in the address determination process of step S3, if the address determination unit 17 determines that even one destination address of the planned outgoing email is not "reliable" (N of step S4), the address checking unit 18 outputs an address check screen in the address checking process of the planned outgoing email (step S6).

Subsequently, the client displays the address check screen, the user checks the destination address that is not "reliable", and when the planned outgoing email can be transmitted after the notification of "checked" from the mailer 3 (Y of step S7), the email transmitting/receiving unit 10 transfers the planned outgoing email to the email transmission server 2 (step S8). The transmission log acquisition unit 15 acquires the transmission log of the transferred planned outgoing email and stores the transmission log in the transmission log storage unit 11 (step S9).

Subsequently, the user weight list generating unit 16 executes the user weight list generation process (step S10), and the email wrong transmission preventing apparatus 1 ends the process. Details of the user weight list generation process will be described below using FIG. 18.

The address determination process of step S3 will now be described.

Figure 16:
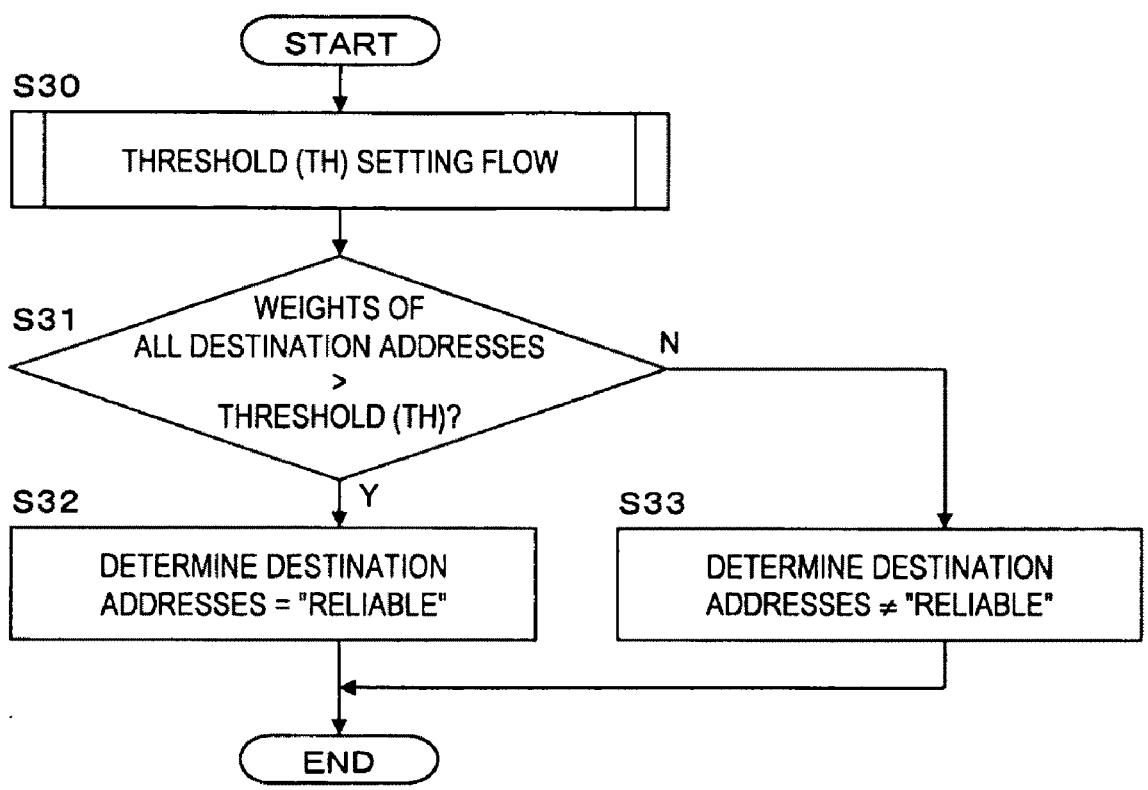
FIG. 16 is a processing flow diagram of an address determination process according to an embodiment.

FIG. 16 is a processing flow diagram of the address determination process.

The address determination unit 17 executes a threshold setting process (step S30). Details of the threshold setting process will be described below using FIG. 17.

The address determination unit 17 acquires the weights of all destination addresses of the planned outgoing email from the user weight list and compares the acquired weights with the threshold TH (step S31). If the weight of a destination address is over the threshold TH (Y of step S31), the address determination unit 17 determines that the destination address is "reliable" (step S32). If the weight of a destination address is equal to or smaller than the threshold TH (N of step S31), the address determination unit 17 determines that the destination address is not "reliable" (step S33). The determination results of steps S32 and S33 are transferred to the address checking unit 18.

Figure 17:
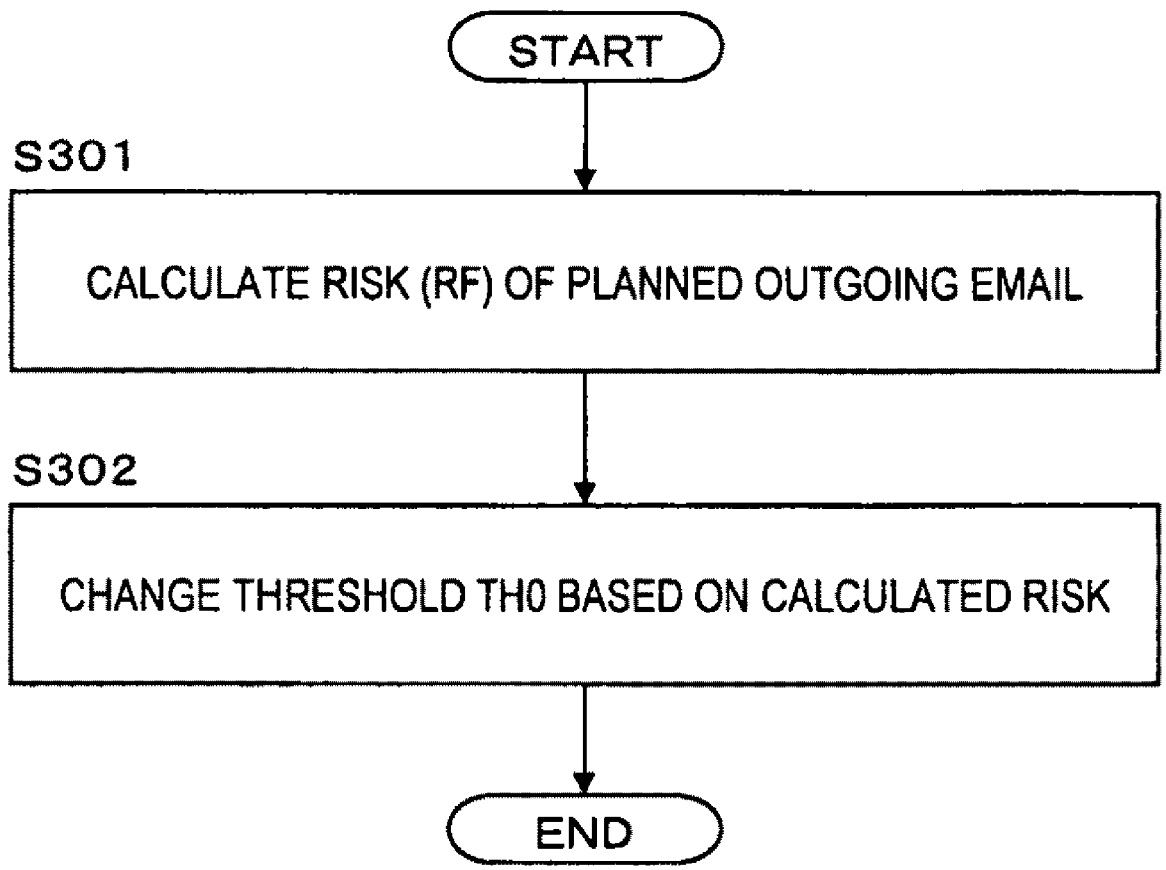
FIG. 17 is a processing flow diagram of a threshold setting process according to an embodiment.

FIG. 17 is a processing flow diagram of the threshold setting process of step S30.

The address determination unit 17 calculates the risk (RF) of the planned outgoing email based on the risk setting information of the risk setting information storage unit 14 (step S301) and changes the threshold TH0 based on the calculated risk to obtain the threshold TH (step S302).

The user weight list generation process of step S10 will now be described.

Figure 18:
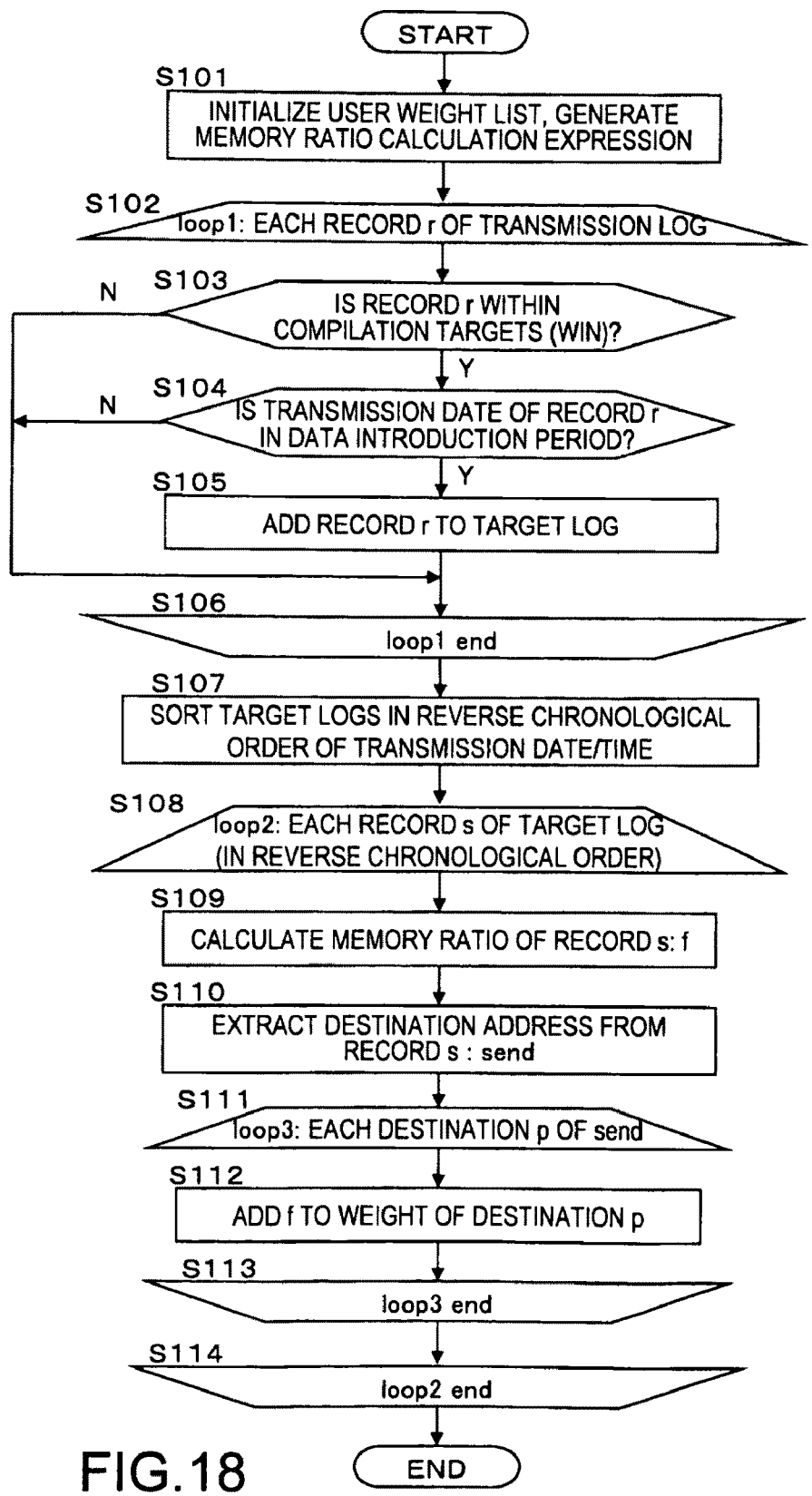
FIG. 18 is a processing flow diagram of a user weight list generation process according to an embodiment.

FIG. 18 is a processing flow diagram of the user weight list generation process.

The user weight list generating unit 16 initializes the weights of the user weight list stored in the user weight list storage unit 12. The user weight list generating unit 16 also generates an expression f( ) for calculating the memory ratio based on the process control information of the process control information storage unit 13 (step S101).

The user weight list generating unit 16 then repeats the following processes of steps S103 to S105 for each record r of the transmission logs of the transmission log storage unit 11 (loop 1: steps S102 to S106).

In the loop 1, the user weight list generating unit 16 determines whether the record r is within the number of target logs (WIN) from the most recent reference (now) (step S103), and if the record r is within WIN (Y of step S103), further determines whether the transmission date of the record r is in the data introduction period stored in the process control information storage unit 13 (step S104). If the transmission date of the record r is in the data introduction period (Y of step S104), the user weight list generating unit 16 adds the record r to target logs as a record group used in the process (step S105).

The user weight list generating unit 16 then sorts the records r of the target logs in reverse chronological order of the transmission date/time (step S107) and repeats the following processes of steps S109 to S113 for each record s of the target logs aligned in reverse chronological order (loop 2: steps S108 to S114).

In the loop 2, the user weight list generating unit 16 calculates the memory ratio f(s) of the record s based on the calculation expression f( ) of the memory ratio generated in the process of step S101 (step S109) and extracts a destination (send) from the record s (step S110). The user weight list generating unit 16 then repeats the process of step S112 for each destination address (p) of the extracted destinations (loop 3: steps S111 to S113).

In the loop 2, the user weight list generating unit 16 adds the calculated memory ratio f(s) to the weight of the relevant destination address (p) and updates the user weight list (step S112).

The ratio of the destination addresses determined "reliable" by the address determination unit 17 changes due to the differences (see FIGS. 7 to 9) in the models used by the user weight list generating unit 16.

FIG. 19 is a diagram illustrating a result of using measurement data to verify the relationship between the calculation expressions indicating the models of the user weight list generation process and the ratios of the "reliable" destination addresses in the address determination process.

In the verification result of FIG. 19, the ratio of the "reliable" destination addresses in the address determination process based on the user weight list generated by the expression of inverse model (see FIG. 7) is 23.361%, the ratio in the exponential model (see FIG. 8) is 33.772%, the ratio in the linear model (see FIG. 9) is 35.356%, and the ratio in the undeclined (flat) model is 40.456%.

According to the verification result, the ratio of the destination addresses determined "reliable" decreases in the order of inverse model<exponential model<linear model<undeclined model. In other words, the evaluation of the weight of the destination is smaller if the inclination of the decline in the model expression used in the user weight list generation process is steeper, and the level of information security can be maintained. Therefore, it can be recognized that a model with an excessively gentle inclination of decrease should not be used as the model of the user weight list generation process. For example, it can be recognized that if a model with a gentle inclination in the decline of memory ratio is used, the determination of "reliable" tends to include an error, such as a memory ratio of a wrongly transmitted destination is also handled as an effective value, or a weight of a destination, to which emails are just transmitted for several times in the past, sluggishly decreases.

The following advantages can be obtained when the email wrong transmission preventing apparatus 1 as illustrated in the foregoing present embodiment is applied to the email transmission system.

(1) The email wrong transmission preventing apparatus 1 updates the transmission log based on the email transmission of the user and also updates the user weight list referenced in the address determination process. As a result, the excessive check operation of the user is reduced while maintaining the security level, and the user is unlikely to get used to the operation as repetitions of the same checking are reduced. This can prevent the reduction in the continuance of the security check effect caused by the user getting used to the operation.

(2) The email wrong transmission preventing apparatus 1 uses the transmission log to automatically update the user weight list. This can reduce the load of the manager and the user related to the maintenance and management of the list of reliable destination addresses.

(3) The email wrong transmission preventing apparatus 1 controls the introduction and discard of data (transmission log) used in the user weight list generation process based on the setting of the process control information. As a result, the operations related to the information inventory, such as review operations of destination addresses of the users and a check operation of the manager, are not necessary, and the management load can be reduced.

Furthermore, as the process control information setting unit 19 periodically acquires the information of the management server 4, the process control information can be automatically set and changed in association with a change in the information of the management server 4 when the security policy is changed, and comprehensive handling is possible without a burden for the user and the manager. Particularly, if there is a change in work or organization, the working period before the change in the situation is acquired from the management server, and the setting of the data introduction period is automatically changed so that the transmission logs in the working period will not be processed. Therefore, the weights of the destination addresses relied in the work before the change can be changed (reduced). This can reduce errors of wrong transmissions of information of new work to the addresses often used in the transmissions in the previous work. As a result, thorough compliance of the security policy can be attained, and the efficiency of the operational management of the manager can be improved.

Although the invention made by the inventor of the present invention is mainly applied to the email wrong transmission prevention process in the description above, it is obvious that the present invention is not limited to the example of application, and various changes can be made within the scope of the description.

A computer reads out a program to execute the email wrong transmission preventing apparatus 1 disclosed as an embodiment of the present invention, and the processing units including the email transmitting/receiving unit 10, the transmission log acquisition unit 15, the user weight list generating unit 16, the address determination unit 17, the address checking unit 18, and the process control information setting unit 19 included in the email wrong transmission preventing apparatus 1 are realized as program modules to establish the email wrong transmission preventing apparatus 1. The program can be stored in an appropriate recording medium such as a computer-readable portable recording memory, a semiconductor memory, and a hard disk, and the program is recorded and provided by the recording media. Alternatively, the program is provided by the transmission and reception by use of various communication networks through a communication interface.

The email wrong transmission preventing apparatus 1 disclosed as the embodiment is described as an apparatus that is arranged separately outside the sender terminal 3 and that transmits and receives data to and from the sender terminal 3 through a network (such as a LAN). However, the email wrong transmission preventing apparatus 1 may be established in the sender terminal 3. Although the email wrong transmission preventing apparatus 1 established in the sender terminal 3 operates in the same way as the processing operations in the embodiment, the address check screen 100 generated by the address checking unit 18 is transferred to the check display input unit 32 as binary data serialized by a main storage.

All examples and conditional language recited herein are intended for pedagogical purposes to aid the reader in understanding the invention and the concepts contributed by the inventor to furthering the art, and to be construed as being without limitation to such specifically recited examples and conditions, nor does the organization of such examples in the specification relate to a illustrating of the superiority and inferiority of the invention. Although the embodiment(s) of the present invention have been described in detail, it should be understood that the various changes, substitutions, and alterations could be made hereto without departing from the spirit and scope of the invention.

What is claimed is:

1. An email wrong transmission preventing apparatus that prevents wrong transmission of email, the apparatus comprising:
a computer that includes a computer processor configured to execute:
storing transmission logs in a computer readable storage medium, each transmission log including a sender, a destination, and a transmission date/time of a planned outgoing email transferred to a transmission server;
acquiring a planned outgoing email transmitted from a client and storing the planned outgoing email;
acquiring the transmission logs, calculating a memory ratio of each address of emails in the acquired transmission logs using a numeric expression indicating a model in which values decline in accordance with a number of elapsed days, and creating a user weight list recording a weight of each destination, which is obtained by compiling the calculated memory ratios of the emails transmitted from day of the transmission date of the planned outgoing email to last day of a predetermined period;
specifying a weight of a destination of the planned outgoing email from the weight list, comparing the specified weight of the destination with a predetermined threshold, and determining that the destination is not reliable when the specified weight is equal to or smaller than the threshold;
outputting information related to a destination address check of the planned outgoing email and receiving an input of "checked" for the destination address when determined that the destination address of the planned outgoing email is not reliable;
transferring the planned outgoing email to the transmission server after receiving the input of "checked"; and
storing a transmission log of the transferred planned outgoing email.

2. The email wrong transmission preventing apparatus according to claim 1, wherein the computer processor further:
stores process control information including the predetermined period to acquire the transmission logs, and
acquires transmission logs including a transmission date/time that falls under the predetermined period.

3. The email wrong transmission preventing apparatus according to claim 1, wherein the computer processor further:
stores risk setting information that is setting information of a process for calculating a risk related to information leakage, based on combinations of pieces of information included in an address, a text, an attached file, and a header of an email, and
calculates the risk of the planned outgoing email based on the risk setting information, uses the calculated risk to change the threshold, and compares the weight of the destination of the planned outgoing email with the changed threshold.

4. The email wrong transmission preventing apparatus according to claim 1, wherein the computer processor further:
periodically acquires information of an external management server and that sets or updates the process control information based on the acquired information.

5. An email wrong transmission prevention method executed by a computer, the method comprising:
accessing a the transmission log storage unit, which stores transmission logs, each transmission log including a sender, a destination, and a transmission date/time of an outgoing email transferred to a transmission server and acquiring the transmission logs of emails transmitted in a predetermined period;

calculating a memory ratio of each address of emails in the acquired transmission logs using a numeric expression indicating a model in which values decline in accordance with a number of elapsed days, creating a user weight list recording a weight of each destination, which is obtained by compiling the calculated memory ratios of the emails transmitted from day of the transmission date of the planned outgoing email to last day of a predetermined period, and storing the user weight list in a user weight list storage unit;

acquiring a planned outgoing email transmitted from a client and holding the planned outgoing email in the email storage unit;

referring to the acquired user weight list, specifying the weight of the destination of the planned outgoing email, comparing the specified weight of the destination with a predetermined threshold, and determining that the destination is not reliable when the specified weight is equal to or smaller than the threshold;

outputting information related to a destination address check of the planned outgoing email and receiving an input of "checked" for the destination address when the destination address is determined to be not reliable;

transferring the planned outgoing email to the transmission server after the input of "checked" is received in receiving the destination address check; and storing a transmission log of the transferred planned outgoing email in the transmission log storage unit.

6. A computer readable recording medium recorded an email wrong transmission prevention program for executing a process of email wrong transmission prevention, the program causing a computer to execute:

storing transmission logs, each transmission log including a sender, a destination, and a transmission date/time of a planned outgoing email transferred to a transmission server;

acquiring a planned outgoing email transmitted from a client and storing the planned outgoing email;

acquiring the transmission logs, calculating a memory ratio of each address of emails in the acquired transmission logs using a numeric expression indicating a model in which values decline in accordance with a number of elapsed days, and creating a user weight list recording a weight of each destination, which is obtained by compiling the calculated memory ratios of the emails transmitted from day of the transmission date of the planned outgoing email to last day of a predetermined period;

specifying a weight of a destination of the planned outgoing email from the weight list, comparing the specified weight of the destination with a predetermined threshold, and determining that the destination is not reliable when the specified weight is equal to or smaller than the threshold;

outputting information related to a destination address check of the planned outgoing email and that receives an input of "checked" for the destination address when the address determination unit determines that the destination address of the planned outgoing email is not reliable;

transferring the planned outgoing email to the transmission server after receiving the input of "checked"; and storing a transmission log of the transferred planned outgoing email.

* * * * *

UNITED STATES PATENT AND TRADEMARK OFFICE
CERTIFICATE OF CORRECTION

| | |
|---|---|
| PATENT NO. | : 8,095,608 B2 |
| APPLICATION NO. | : 12/659459 |
| DATED | : January 10, 2012 |
| INVENTOR(S) | : Ryota Fukasawa et al. |

It is certified that error appears in the above-identified patent and that said Letters Patent is hereby corrected as shown below:

In the Claims

Column 18, Line 14, in claim 1, delete "logs ," and insert -- logs, --, therefor.

Column 18, Line 65, in claim 5, delete "a the" and insert -- a --, therefor.

Column 19, Line 8, in claim 5, delete "destination ," and insert -- destination, --, therefor.

Signed and Sealed this
Twenty-fourth Day of February, 2015

Michelle K. Lee
*Deputy Director of the United States Patent and Trademark Office*